(12) United States Patent
Morichi

(10) Patent No.: US 11,835,477 B2
(45) Date of Patent: Dec. 5, 2023

(54) SYSTEM AND METHOD FOR IDENTIFYING NUCLEAR THREATS

(71) Applicant: CAEN TECHNOLOGIES, INC., New York, NY (US)

(72) Inventor: Massimo Morichi, Madison, CT (US)

(73) Assignee: CAEN TECHNOLOGIES, INC., New York, NY (US)

( * ) Notice: Subject to any disclaimer, the term of this patent is extended or adjusted under 35 U.S.C. 154(b) by 65 days.

(21) Appl. No.: 17/375,743

(22) Filed: Jul. 14, 2021

(65) Prior Publication Data

US 2022/0074876 A1 Mar. 10, 2022

Related U.S. Application Data

(60) Provisional application No. 63/051,408, filed on Jul. 14, 2020.

(51) Int. Cl.
| | |
|---|---|
| *G01N 23/204* | (2006.01) |
| *G01N 23/20* | (2018.01) |
| *G01T 3/00* | (2006.01) |
| *G01V 5/00* | (2006.01) |
| *G01T 3/06* | (2006.01) |

(52) U.S. Cl.
CPC ..... *G01N 23/204* (2013.01); *G01N 23/20083* (2013.01); *G01T 3/00* (2013.01); *G01T 3/06* (2013.01); *G01V 5/0091* (2013.01)

(58) Field of Classification Search
CPC .. G01N 23/204; G01N 23/20083; G01T 3/00; G01T 3/06; G01V 5/0091
See application file for complete search history.

(56) References Cited

U.S. PATENT DOCUMENTS

| | | | |
|---|---|---|---|
| 2007/0290136 A1* | 12/2007 | Ivan | G01T 1/17 |
| | | | 250/361 R |
| 2010/0038550 A1* | 2/2010 | DeVito | G01V 5/0069 |
| | | | 250/370.11 |

OTHER PUBLICATIONS

Morichi et al., A Novel Portable Device For Gamma And Neutron Spectroscopy With Special Nuclear Material Identification, Jan. 20, 2020, EJP Web Conf., vol. 225, Iss. 07006, pp. 1-4 (Year: 2020).*
Mangiagalli et al., A Novel Portable Device for Gamma and Neutron Spectroscopy with Special Nuclear Identification Capabilities, Dec. 7, 2018, Int'l Conf. Security of Radioactive Material (Vienna, Austria), IAEA—Int'l Nuclear Info System, pp. 1-529 ( especially pp. 1, 11, & 210-211) (Year: 2018).*

* cited by examiner

*Primary Examiner* — David P Porta
*Assistant Examiner* — Casey Bryant
(74) *Attorney, Agent, or Firm* — AMSTER, ROTHSTEIN & EBENSTEIN LLP

(57) ABSTRACT

A method and a device for the detection of radioactive sources, based on the simultaneous use of two or more radiation detectors of different types and the composition of the data collected by the two or more radiation detectors.

10 Claims, 26 Drawing Sheets from step 11.a) Fig. 2B

12.a) Rejection of possible duplicated peaks for peaks $E_{i,f}, E_{j,f}, E_{i,f} > E_{j,f}$ such that $E_{i,f} - E_{j,f} < 1.0\, \sigma_{i,f}$ 7) Rejection of possible duplicate peaks

13.a) Compton edge and backscatter peak identification Rejecting $E_{j,f}$ if identified as the Compton Edge (CE) of the photopeak $E_{i,f}$ Labeling $E_{j,f}$ as Backscatter peak (BS) of the photopeak $E_{i,f}$ according to its distance to the theoretical value, its resolution and its height (for both CE and BS cases)

8) Compton edge and backscatter peak identification to be continued at Fig. 3A

Fig. 5: Cf252 with no shielding and masking (note the clusters of the different measurements associated with the different groups of SNM that can be well delimited in rectangular regions)

Fig. 6: Cf252 with lead shielding and no masking
(note the clear shift of the cluster to the left)

Fig. 7: Cf252 with polyethylene (PE) shielding and no masking (note the clear shift of the cluster to the right)

Fig. 8: Cf252 with masking scenarios carried out with gamma sources with different intensities Fig. 9: The points in blue, orange, green, red and purple respectively represent the measurements with sources of Cf-252, Pu, U, AmBe and AmLi.

Fig. 10: Identifications of Fig. 9 with more than 8 neutrons per minute.

Fig. 11: Identifications of Fig. 9 with more than 8 neutrons per min, without shielding Fig. 12 Repeated measurements n-times with two sources of PU with different enrichments 60% and 70%

Fig. 13 Pu with different degrees of enrichment without shielding and masking

Fig.14 Identifications with sources shielded by Pb

Fig.15 Identifications with sources shielded by PE

Fig. 16: Identification with sources shielded by Pb + PE

Fig. 17: masked sources with gamma sources

SYSTEM AND METHOD FOR IDENTIFYING NUCLEAR THREATS

FIELD OF THE INVENTION

The present invention relates to the technical field of the methods and devices for detecting and measuring radioactivity and radioactive sources.

STATE OF THE ART

Between 1993 and 2006 there were 1080 confirmed cases of illicit trafficking and unauthorized activities involving nuclear and radioactive material worldwide (source: IAEA). Eighteen of these cases concern material that can be used for the production of bombs, namely Plutonium and Highly Enriched Uranium (HEU). The IAEA also reports 124 cases involving materials that could be used for the production of so-called "dirty bombs", i.e., bombs in which conventional explosives are detonated to disperse radioactive material. The IAEA concludes that these materials pose a potential continuing threat to the security of the international community.

For this reason, a considerable effort is made in monitoring the transport of goods by land, air and sea in all countries, particularly the USA and the European Community. In this context, particular attention is paid to avoiding false alarms by the instrumentation used for monitoring. In fact, in a first phase, automatic instruments are normally used. A typical example are radiation portals which are made of one or more detection units that constitute a gate where the material to be analyzed must pass. In the event of an alarm, it is necessary to inspect the suspect material with portable instruments to identify its exact nature. If no radiation source is identified it is necessary to proceed with a physical inspection of the suspect material, which however entails considerable time and costs.

It is therefore necessary to have reliable tools that make it possible to identify with certainty the nature of the material inspected.

Portable devices for the identification of radioactive sources, whose characteristics are defined by the IEC62327 standard, are known and commercially available. These devices use spectroscopic detectors for gamma radiation like organic or inorganic scintillators such as NaI (TI) or $LaBr_3$. This type of detector obtains the identification of the radioactive material by recognizing the photopeaks produced by the characteristic transitions of the various radioisotopes present in the spectrum range detected. These systems are not used to detect the possible presence of neutrons because the response of inorganic scintillators to neutrons is statistically irrelevant. In fact, the neutron interaction with the inorganic crystal lattice is essentially due to the inelastic diffusion from excited levels of the nuclei constituting the scintillator. The cross section of this inelastic diffusion is extremely low, thus producing a characteristic gamma radiation which is statistically low in number and also indistinguishable in energy from the direct component of the gamma radiation. For all these reasons it is impossible to separate the neutron contribution to the spectrum from the gamma radiation due to the ambient background. For this reason, radiation monitor devices are sometimes available with the addition of a neutron detector (typically a $^3$He proportional counter) in order to detect also the presence of neutron sources.

The identification of neutron sources is in fact fundamental since it is characteristic of: some radioisotopes for industrial applications (e.g., sources of $^{252}Cf$ or Am/Be); some types of nuclear waste (in which neutrons are emitted through $(\alpha, n)$ type reactions), and the so-called Special Nuclear Material, especially Plutonium.

Main drawback of the systems described above is that they do not provide any information suitable for identifying the neutron source in the absence of a clear associated gamma signal. This is because in such devices the neutron and gamma detectors are totally decoupled, and so is the information they provide. The neutron detectors used so far in portable systems provide only an indication of the number of neutrons present, while the information on gamma radiation must be obtained from inorganic scintillators. In summary, one of the peculiar characteristics of this type of system is that neutron detectors have a very low sensitivity to gamma radiation and, conversely, gamma detectors have a weak sensitivity to neutrons. This is particularly critical for the identification of Special Nuclear Material. According to the IEC62327 standard, the identification of the Special Nuclear Material is provided only by gamma spectroscopy for sources shielded with 5 mm of iron. However, in the case of larger shields or heavier metals (for example lead or tungsten) the gamma emission could be too weak to lead to a direct identification. In all these cases, the current available technology would only detect an excess of neutrons which, however, would not be usable for discriminating the type of the neutron source and perform a correct identification.

To date, all the portable or transportable or fixed installed portal monitor measuring instruments and systems used for field measurements use only and exclusively separate analyses for the gamma and neutron sources. They identify gamma isotopes and separately count the neutrons, typically with $^3$He detectors, with no correlation between the two. The same standards such as ANSI and IEC refer to the ability to measure the presence of the gamma and neutron sources but do not take into consideration complex scenarios such as the certain determination of the neutron emitter (i.e., the identification of the reactions (alpha-n)). Furthermore, on the neutron measurement, the same IEC and ANSI standards impose conditions only on the counting performances in order to detect the presence/absence of neutron emitters but not to define their type of origin (i.e. to carry out their identification).

Therefore, an object of the present invention is to provide a method based on calculation algorithms that allow detecting radioactive sources by exactly identifying their type and not merely their generality, as has been carried out until now in portable, transportable and fixed installed portal monitors/systems These algorithms, based on mixed gamma and neutron detection and identification, allow the exact identification of the radioactive material also in the absence of clearly identifiable gamma emissions.

Another object of the invention regards the implementation of such a method in a portable instrument (less than 10 kg), a transportable (less than 20 Kg) instrument or a radiation portal monitor.

Another object of the present invention is to provide a new method for the detection of radioactive sources which can be implemented by means of a single detector for the simultaneous detection of the gamma and neutron emissions of the same source.

Another object of the present invention is to be able to discriminate between the different types of neutron sources, even in the absence of clearly identifiable gamma emission.

SUMMARY OF THE INVENTION

The present invention concerns a method and an device for the detection of radioactive sources, based on the simultaneous use of two or more radiation detectors of different types and in particular consisting of a possible composition of detectors of type I, II mainly and/or III (see definition of detectors below). Thanks to this composition of different type of detectors, all integrated in a single instrument, is possible to obtain the identification of the Special Nuclear Materials (SNM) contained in devices of potential terrorist origin such as Radioactive Dispersal Devices (RDD) or Improvised Nuclear Devices (IND) through a single simultaneous measurement. This single measurement, performed simultaneously by all the detectors installed in the device, includes both gamma and neutron emissions, even in conditions of their potential shielding and/or masking with almost instantaneous measurements that generate alarms within a few seconds. Moreover, it provides a complete identification of the source in its gamma and neutron radionuclides with the possibility to have also the instantaneous assessment of the total or the independent equivalent environmental dose H*(10) both from gamma radiation and from neutron radiation.

The identification of neutron sources is essential for identifying special nuclear materials or products resulting from fuel cycle processing. Such products are generated by reprocessing of nuclear fuel that has been irradiated within a nuclear reactor or by the so called "spent fuel" which is irradiated nuclear fuel at the end of life that is removed by the reactor core. Other sources of these products are:

the radioisotopes for industrial applications such as $^{252}$Cf;
sources where the neutrons are emitted through the (alpha, n) type reactions i.e., AmLi, AmBe;
typical isotopes of the Special Nuclear Material (SNM) such as Plutonium-239 and U-235.

The peculiarity and uniqueness of the present invention lies in the implementation of algorithms which, simultaneously in a parallel and sequential manner, analyze gamma and neutron counting data by processing neutron counts and multiplicities and analyzing the associated gamma spectra with the help of chosen isotope libraries. On these analyses is then applied a selection criterion to maximize the probability of identifying the source in both its gamma and neutron nature and associating a specific Level of Confidence, CL (CL=Probability of exact nuclide identification).

The idea underlying the invention is, in addition to obtaining both neutron and isotope identification of the emitting ranges, being able to ensure their identification under certain critical detection conditions, i.e., the so-called masking condition where a strong gamma source of natural, medical, or industrial nature is added to a neutron emitting source. This condition changes significantly the n/gamma multiplicities thus creating problems to the recognition of the neutron source. Hence the idea of introducing a second detector into the measurement system that can be chosen, for instance, as a scintillator with a resolution better or equal to 8% (like i.e., NaI(TI) with a typical FWHM at Cs-137 of 7%, or CeBr with typical FWHM at Cs-137 of 3% or CsI or SrI or LaBr with typical FWHM between 2.5 and 3% at Cs-137(661 KeV)) to identify the peaks of the gamma sources in order to be able to subtract them from the n-gamma measurement part thus obtaining a correction in the neutron/gamma multiplicity.

For example, by identifying the photopeak of the metastable Proactinium Pa-231m at 1.001 MeV the algorithm can validate or not validate HEU High Enriched Uranium (100 gamma per second emitted at 1 MeV for each gram of U-238).

The implementation of the thermal neutron detector (type III) in parallel with the type II detector would also allow executing the thermal/fast flow neutron ratio thus facilitating the identification of the neutron emitter in a special way if it is an SNM.

Each SNM has its own radioactive signature, i.e., characteristic neutron, and γ-ray emission spectra, which allow identification. The emission of neutrons, both by spontaneous fission and induced by a particles, is about $2 \times 10^5$ n/s, with 12 kg of WGU (Uranium Weapons Grade), and $2 \times 10^5$ n/s, with 4 kg of WGPu (Plutonium Weapons Grade). Remember that IEC62327 standard requires a neutron alarm trigger within 2 seconds for a 20.000 n/s emitting source at 25 cm of distance. For most of the isotopes of interest, the neutrons emitted are accompanied by γ rays, on average 6.5 photons, with 1 MeV energy, by fission. Using tungsten as shielding material, the emission is brought to 30 γ/s and 100 γ/s, respectively for WGU and WGPu.

Since the γ emission can be more easily shielded, in such a way as to be confused with the ambient background, the identification of WGU and WGPu must therefore be carried out through the detection of neutrons, which have a natural background around three orders of magnitude less than that γ. The greatest difficulty lies in the identification of WGU, especially if tungsten is used as shielding/tamper material, due to the low number of neutrons emitted. In this case it is only possible to identify the SNM material at short distances. For this need a portable investigation system is necessary because it allows detecting and, at the same time discriminating and correctly identifying, γ and neutron rays and exactly associating the type of special nuclear material (SNM).

The present invention provides for both parallel and sequential analyses, both counting and spectroscopic, coming from two or more gamma and gamma/neutron radiation detectors, with a comparative validation and with an assessment of levels of reliability in the identification (both gamma and neutron) also allowed by virtue of a unique experimental calibration process of the family of measurement and automatic self-calibration instruments.

BRIEF DESCRIPTION OF THE FIGURES

Further features and advantages of the present invention will be apparent from reading the following detailed description, provided by way of non-limiting example, with the aid of the figures illustrated in the attached tables, in which.

Figure 1A:
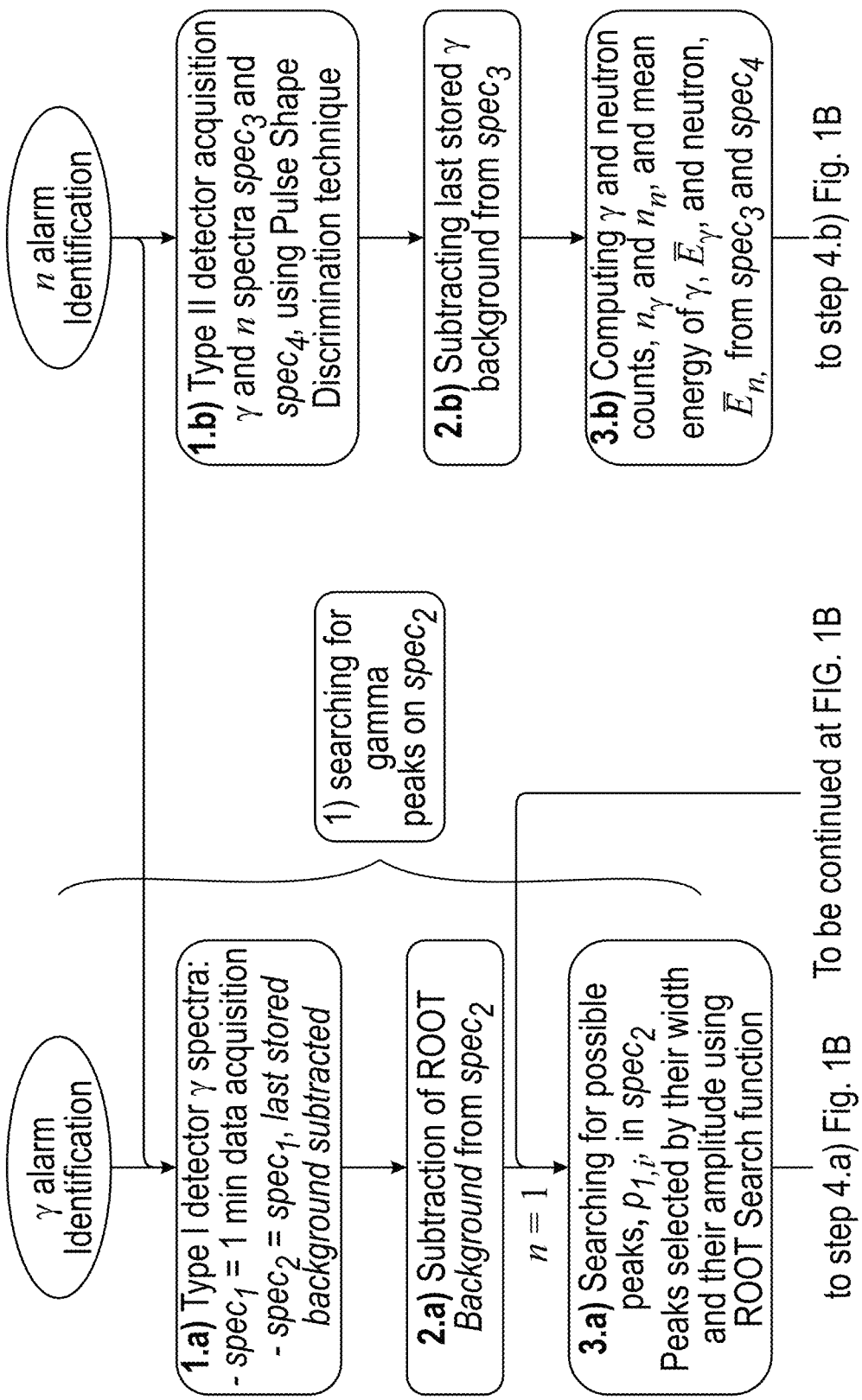
FIG. 1 illustrates a part of the flowchart of the method for gamma and neutron identification according to the invention.
Figure 1B:
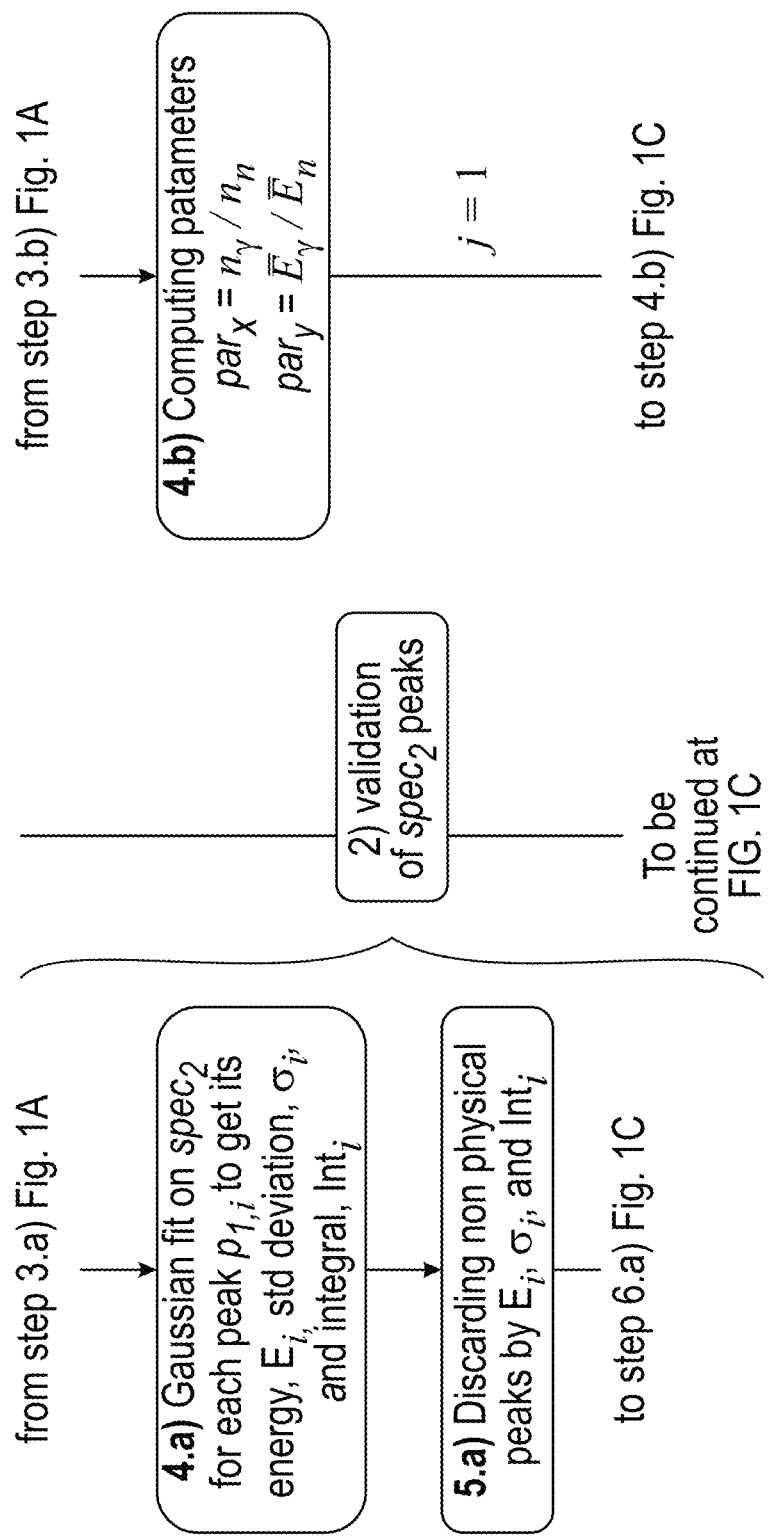
Figure 1C:
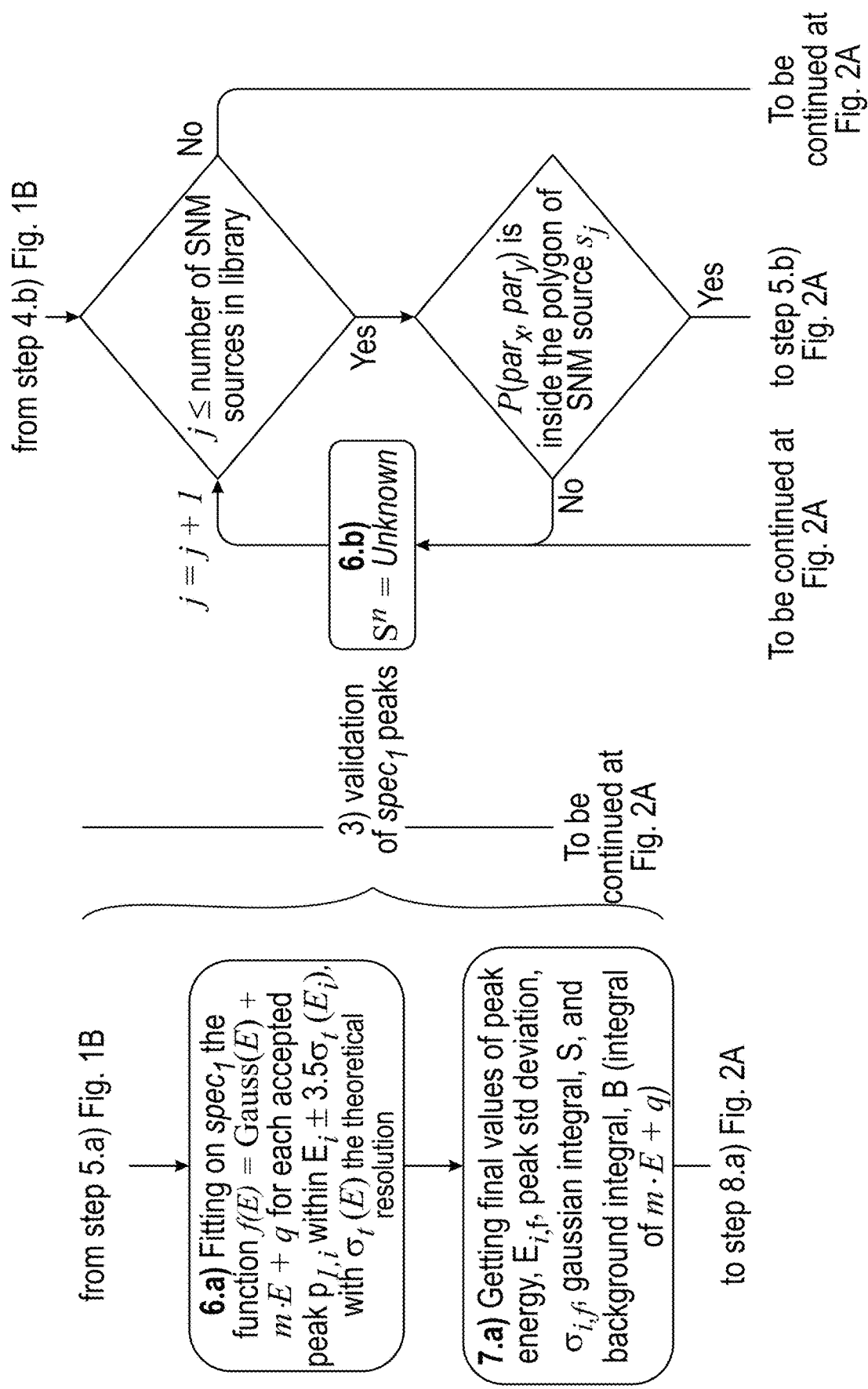
Figure 2A:
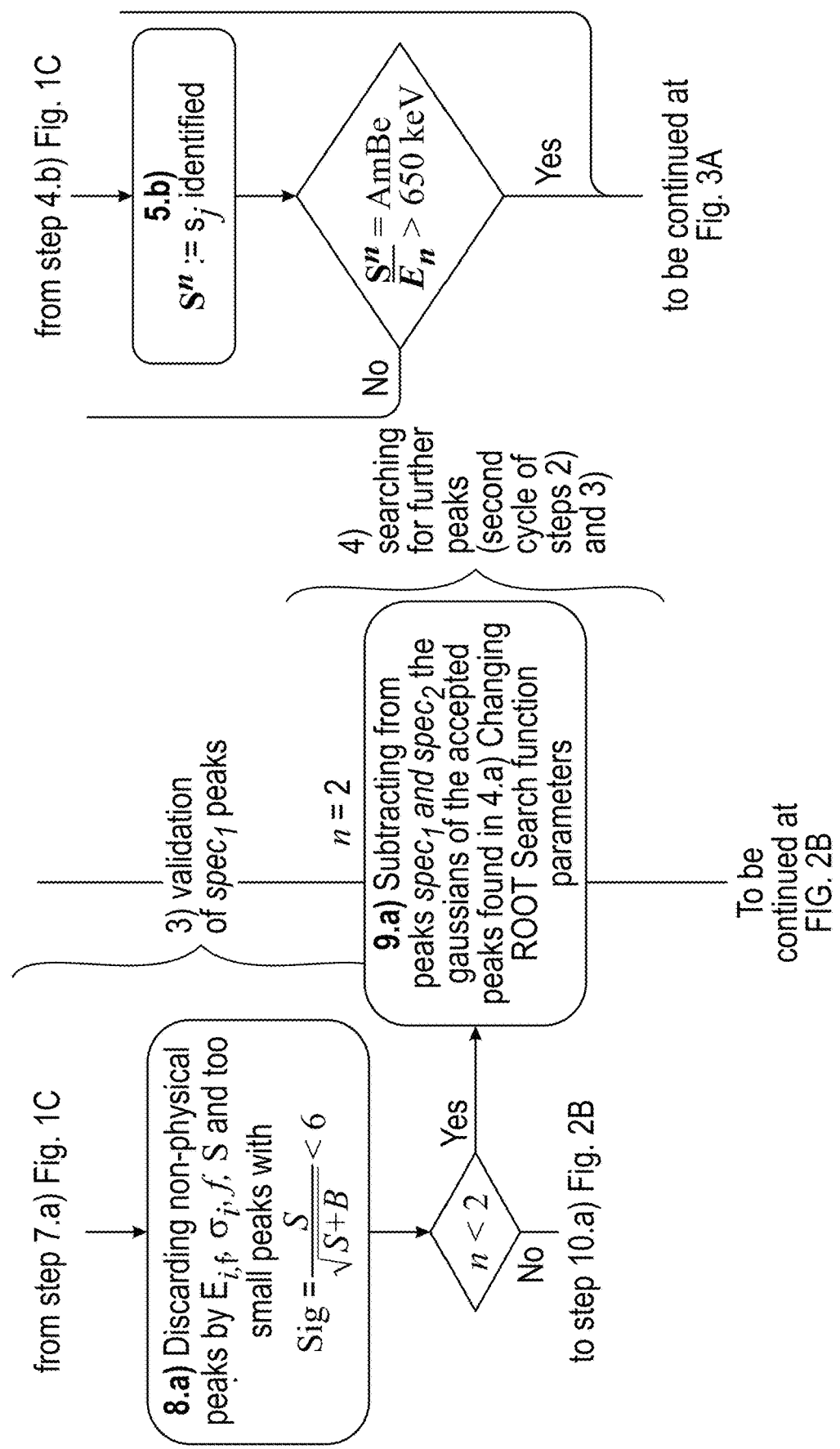
FIG. 2 illustrates a part of the flowchart of the method for gamma and neutron identification according to the invention.
Figure 2B:
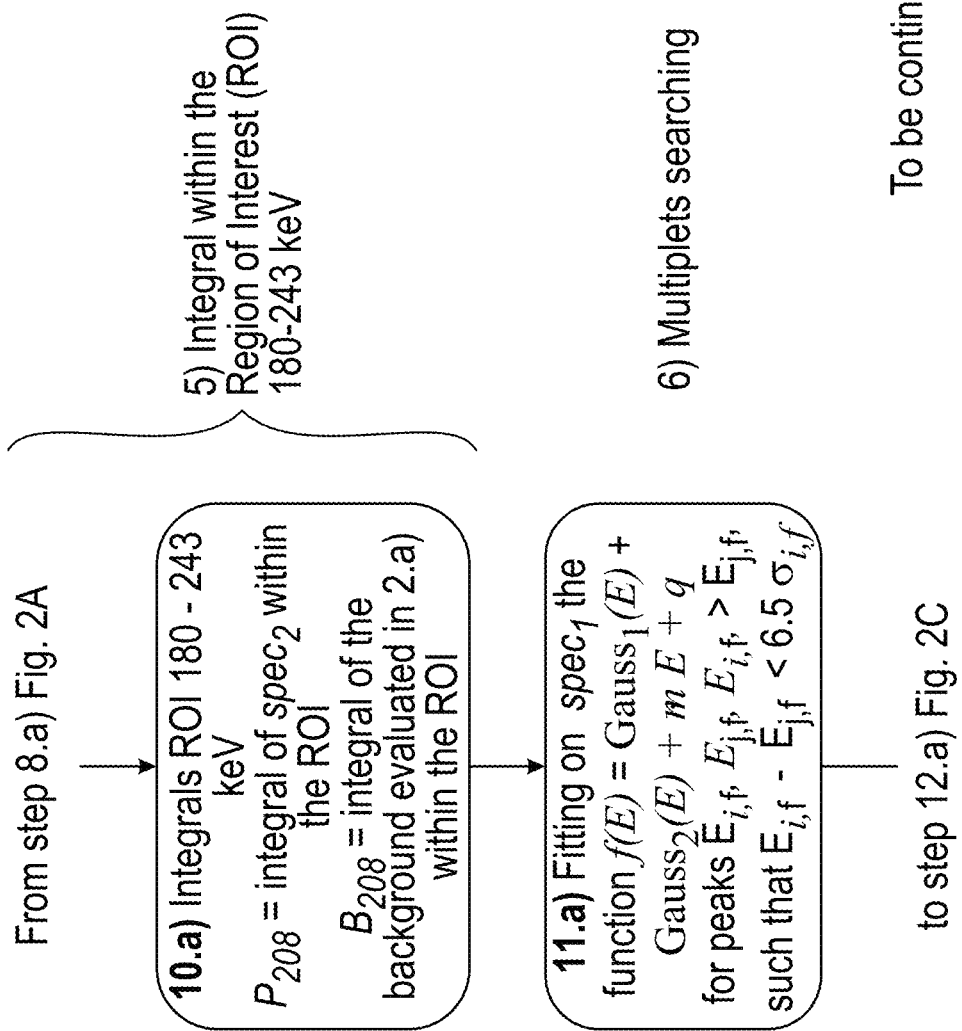
Figure 3A:
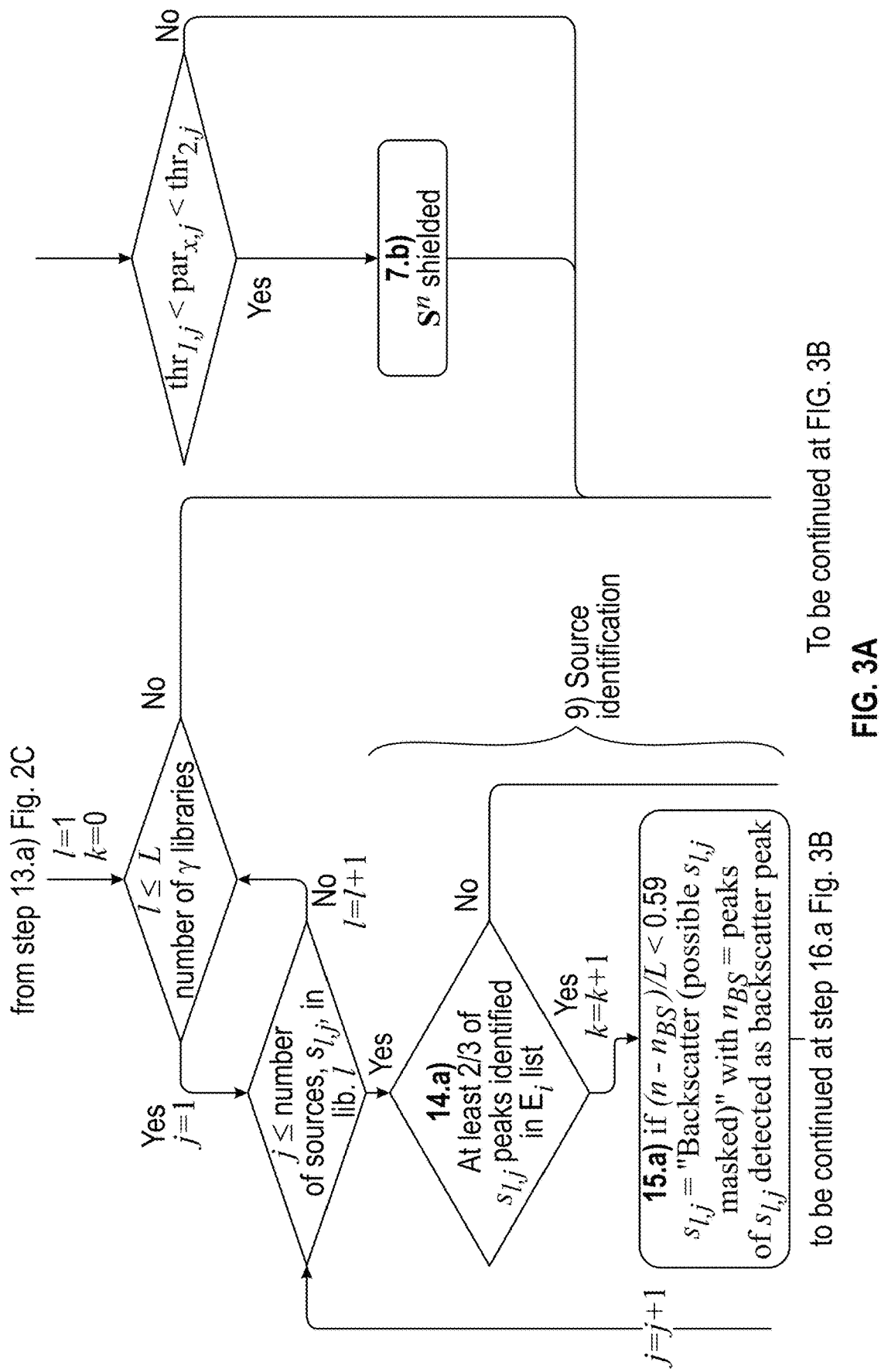
FIG. 3 illustrates a part of the flowchart of the method for gamma and neutron identification according to the invention.
Figure 3B:
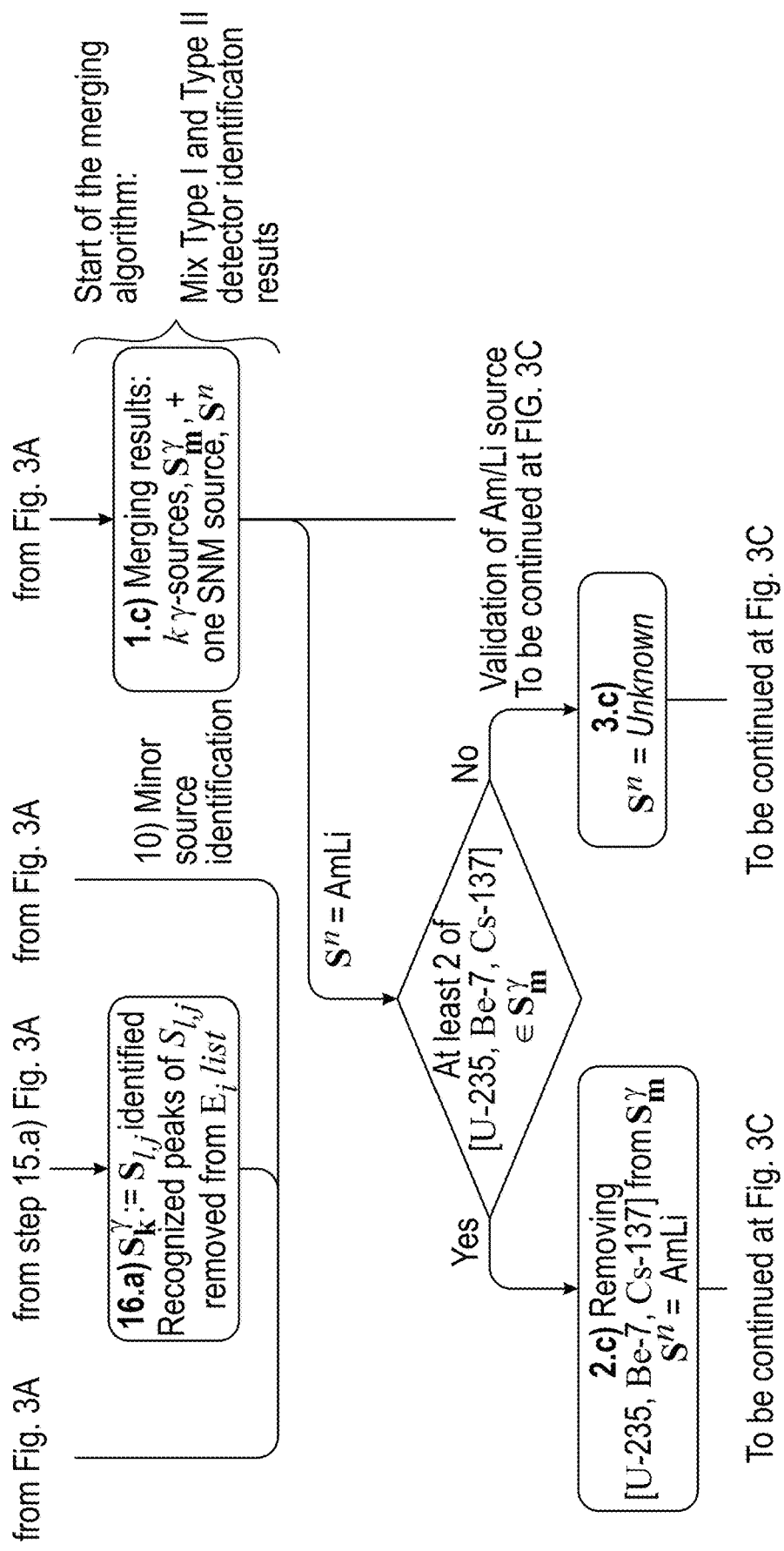
Figure 3C:
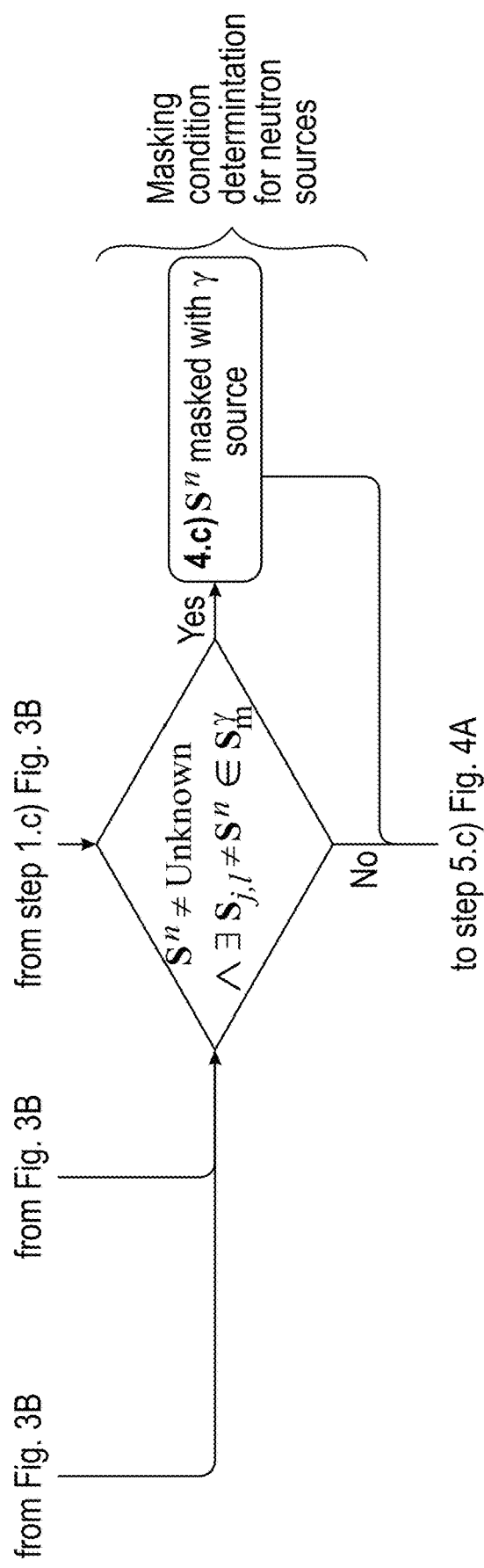
Figure 4A:
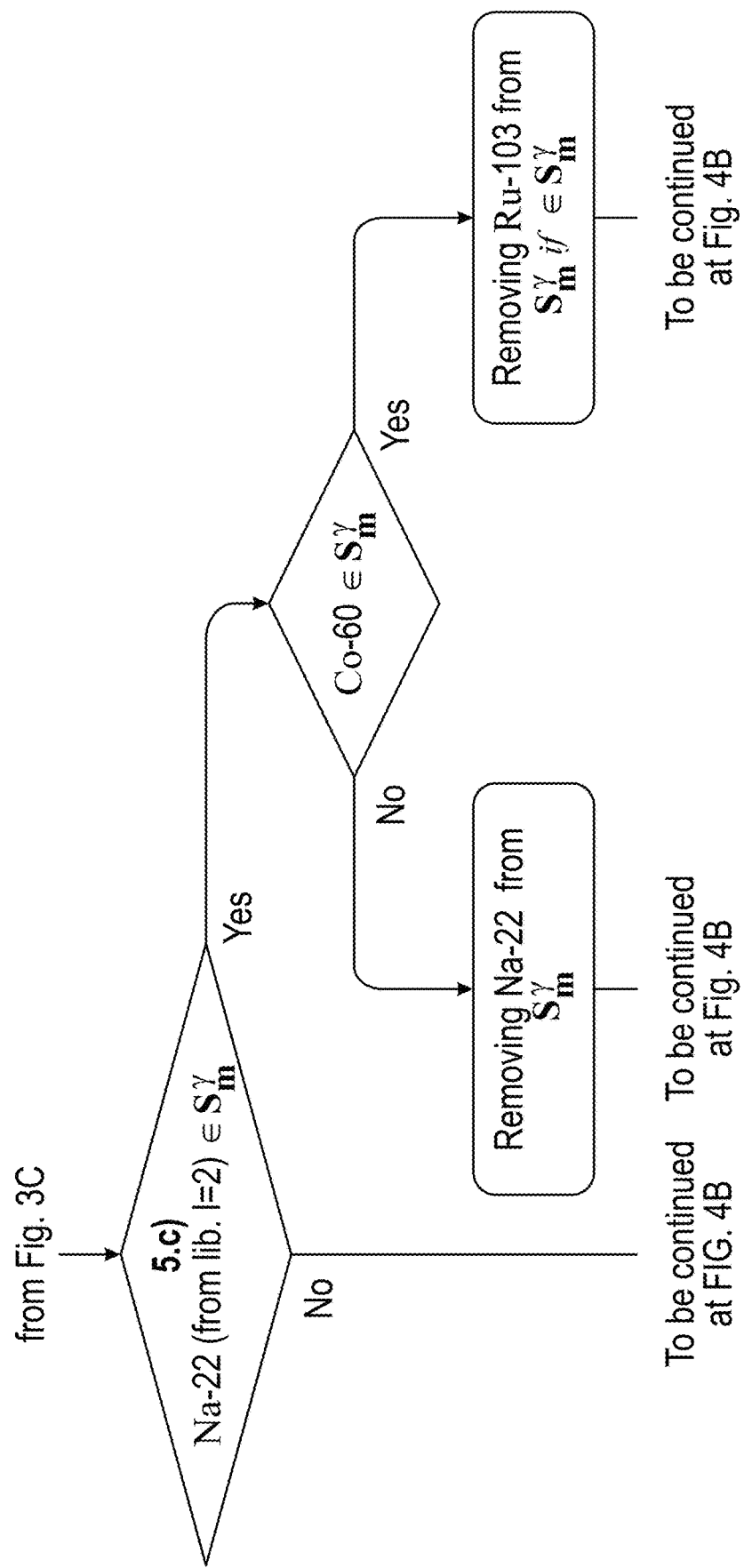
FIG. 4 illustrates a part of the flowchart of the method for gamma and neutron identification according to the invention.
Figure 4B:
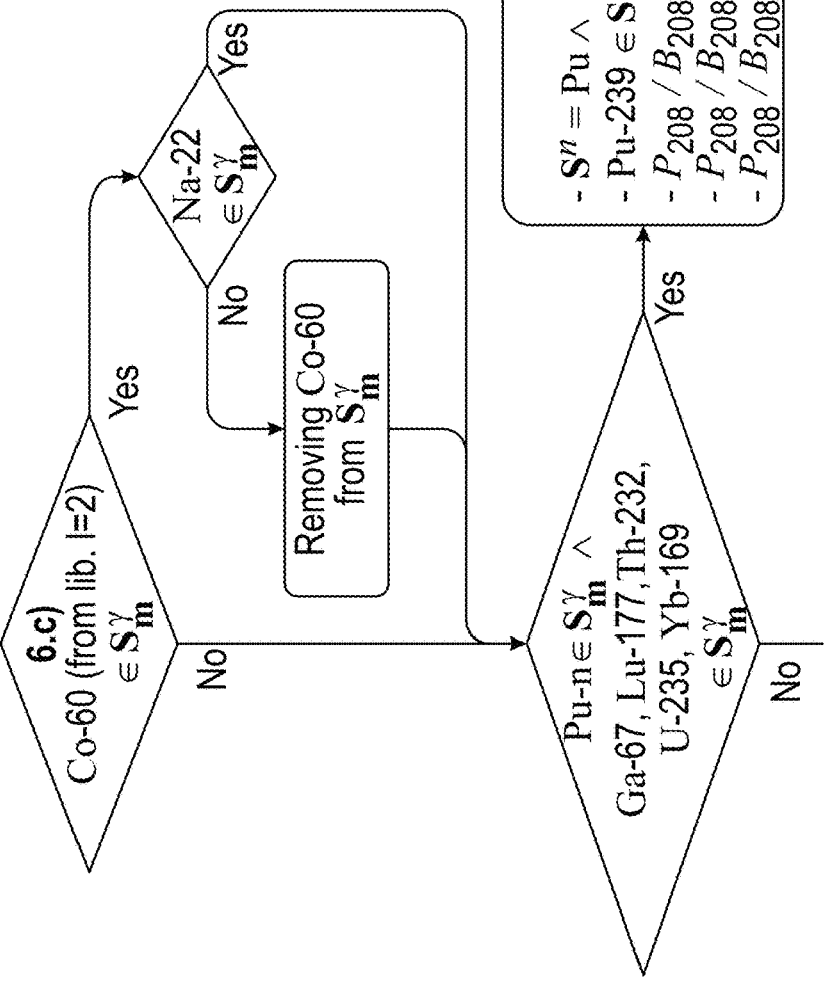
Figure 4C:
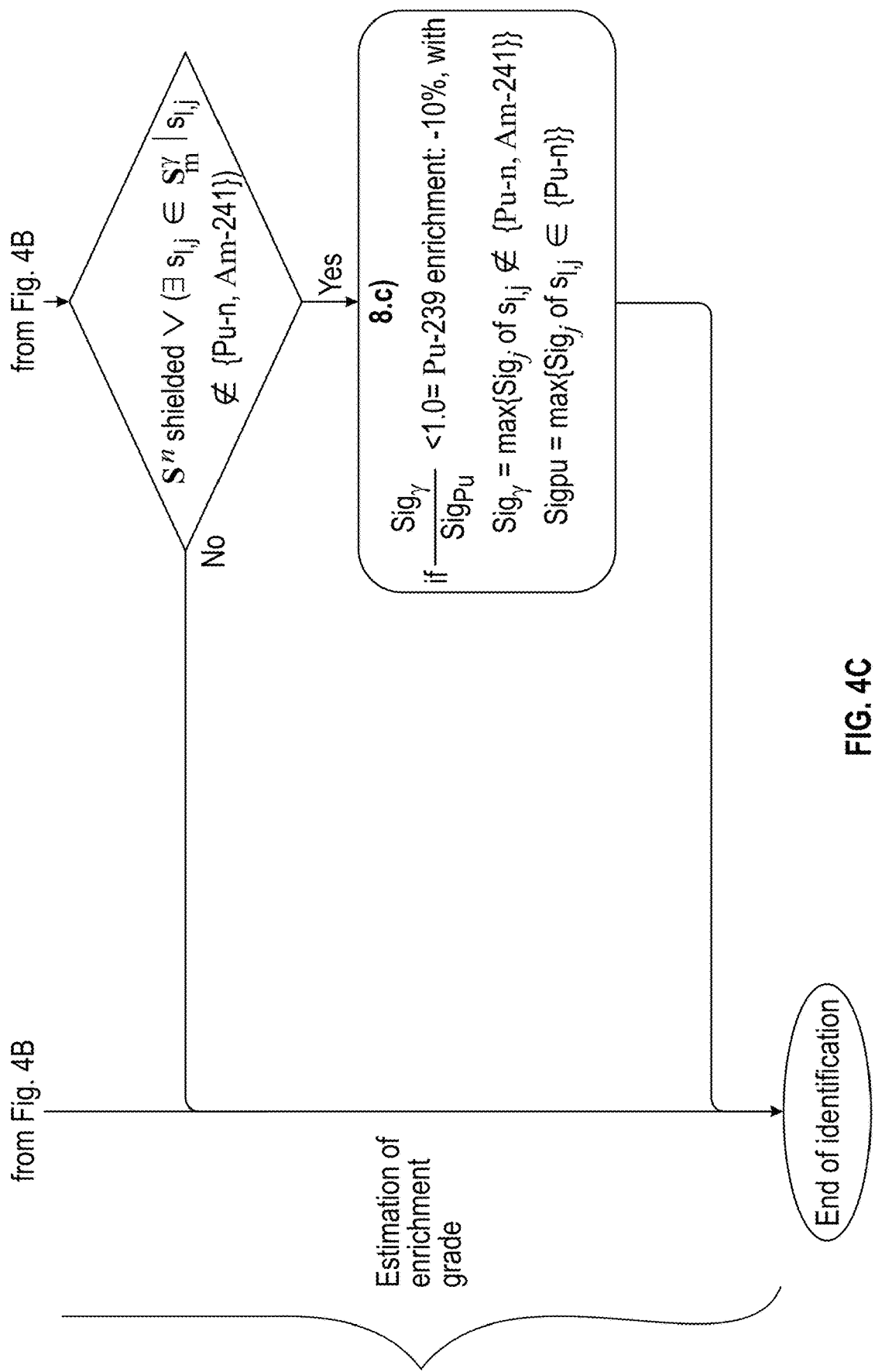

The following description of exemplary embodiments refers to the accompanying drawings. The same reference numerals in different drawings identify the same or similar elements. The following detailed description does not limit the invention. The scope of the invention is defined by the attached claims.

In the following description reference numbers 1.a) to 16.a); 1.b) to 5.b) and 1.c) to 8.c) which are used in the flowcharts of FIG. 1 to FIG. 4 have been inserted in the text between square brackets.

DETAILED DESCRIPTION OF THE INVENTION

The present invention concerns a method and an device for the detection of radioactive sources, based on the simultaneous use of two or more radiation detectors of different types and in particular consisting of a possible composition of detectors of type I, II or III. In further detail, the detectors used simultaneously according to one embodiment of the present invention are:

Type I detectors capable of producing a gamma spectrum which can be used in the system of the present invention. These detectors are organic or inorganic scintillators based on luminescent materials and coupled with a signal readout system (for example but not limited to PMT or SiPM) type devices. The luminescent material can be chosen between NaI(Tl), NaIL, CsI, LaBr$_3$, CLLB, BaF$_2$, CdWO$_4$, CaF$_2$(Eu), CaWO$_4$, CdWO$_4$, Gd$_2$O$_2$S, LaCl 3(Ce), PbWO$_4$, LuI$_3$, LSO, LYSO, YAG(Ce), ZnS(Ag), ZnWO$_4$, BGO, and CeBr$_3$ etc. Type I detectors could be also high-resolution semiconductor detectors such as those with hyper-pure Germanium and, in particular, HpGe, CdZnTe, TlBr, etc.

Type II detectors capable of counting both gamma and neutrons with adequate and properly designed processing electronics (typically digitizers but not limited to) of their signals, such as liquid scintillator or plastic scintillator detectors, both organic or inorganic. An example is the organic liquid scintillator detector EJ309 used by us for validation but not limited to. In fact, other similar scintillation detectors could be used with scintillation proprieties enough to allow to resolve gamma and neutron pulses from the same detector and correlate these pulses with a very precise timing up to 10 ns if combined with a properly designed digitizers using PSD Pulse Shape Discrimination.

Type III Detectors with thermal neutron detection capabilities or gas detectors, including gas, solid state or plastic scintillator detector with high efficiency for the detection of thermal neutrons.

The combination of two detectors, for instance arbitrarily chosen among one of type I and one of type II allows:

For type I: Obtaining a gamma spectrum in an energy range from 0 KeV to 10 MeV.

For type II: Obtaining a gamma spectrum with low resolution but enough to allow seeing the Compton edge of the radiation to which they are subjected and simultaneously to detect neutrons with enough efficiency.

The method according to the present invention is based on calculation algorithms that allow detecting radioactive sources by exactly identifying their type and not merely their generality.

One preferred embodiment of the method for identifying a radioactive source according to the present invention makes use of the following data collected from said type I and type II detectors:

Data from Type I detector (gamma spectroscopic detectors) that generates:

Spec1: identification spectrum acquired with Type I detector in case of gamma alarm. Background-Type I—acquired with Type I detector continuously when no alarm is present to have a reference spectrum in absence of alarm.

Spec2=Spec1—Background-Type I normalized by acquisition duration.

Data from Type II detector (gamma/neutron detectors) that generates:

Spec3: gamma identification spectrum acquired with Type II detector in case of only neutron or gamma and neutron alarm.

Spec4: neutron identification spectrum acquired with Type II detector in case of only neutron or gamma and neutron alarm.

Background-Type II— acquired with Type II detector continuously when no alarm is present to have a reference spectrum.

Furthermore, one preferred embodiment of the method for identifying a radioactive source according to the present invention comprises the steps of:

Detecting gamma emitting sources with a type I detector.

Detecting the plurality of impulses originating from a type II detector associated with respective neutron emissions and gamma emissions from said radioactive source.

identifying a first portion of said plurality of impulses associated with respective neutron emissions and a second portion of said plurality of impulses associated with respective gamma emissions, said step of identifying said first and second portion of impulses including the calculation for each impulse of a respective total integral Ltot of the impulse;

determining a first number $n_n$ of impulses belonging to the first portion (total number of events in Spec4) and a second number $n_\gamma$ of impulses belonging to the second portion (total number of events in Spec3);

calculating a first average value $E_n$ and a second average value $E_\gamma$ of the total integral $L_{tot}$, in which $$E_n = \sum_{n_n} \frac{L_{tot}}{n_n}$$

and $$E_\gamma = \sum_{n_\gamma} \frac{L_{tot}}{n_\gamma};$$

Then calculating a datum $par_x=n_\gamma/n_n$ and a datum $par_y=\overline{E}_\gamma/\overline{E}_n$;

identifying as a function of the data $par_x$, $par_y$ if the radioactive source belongs to a first group of neutron sources or to a second group of gammas sources, wherein if the radioactive source belongs to the first group of neutron sources, identifying that radioactive source through the following steps:

perform identification of the gamma sources detected with a type I detector, through spectroscopy.

merge data coming from type I and type II detectors through the following steps:

step 1: double confirmation of the Special Nuclear Material SNM identification if both gamma and neutron are detected. In an embodiment, the Type I detector can identify the SNM sources through a gamma spectroscopy measurement consisting in the identification of the characteristic gamma lines emitted by the sources. Moreover, an enrichment level estimation of the SNM is performed by measuring the ratio of the detected gamma lines and their respective backgrounds. The second confirmation is provided by the Type II detector identification that weight the gamma and neutron counting and energy ratios ($par_x$ and $par_y$) to identify the SNM source.

Step 2: detection of masking condition of neutrons in presence of gamma, performed by merging the results of the identification of the Type I detector with the results of the identification of the Type II detector. In fact, the Type I detector is sensitive only to gamma radiation, while the Type II detector can detect both gamma and neutron. At the end of the identification procedure the results are merged and if additional gamma sources are detected in addition to the detected SNMs, then the masking condition is confirmed.

Step 3: detection and identification of gamma and neutron sources in presence of moderators and/or shielding materials through the Type II detector.

The identification algorithm of the Type II detector provides identification regions for each SNM defined by values of $par_x$ and $par_y$. For each region of each SNM it is possible to define sub-areas obtained from the variation of $par_x$, $par_y$ or both according to the variation of the gamma or neutron measured rate. The gamma and neutron rate variation are strictly correlated to the presence of heavy material shield or moderator material that cause the shift of the $par_x$ and $par_y$ value.

Gamma Spectrum Correction from Contribution of Masking Gamma Sources

The use of an inorganic scintillator detector, such as $CeBr_3$, of type I, allows the result of the identification method of neutron emitters to be corrected in the event of a high range end or the presence of masking sources.

The gamma spectrum can in some conditions include both radiation from the neutron emitting source and from any masking sources. The masking source can therefore modify the result of the identification of the neutron source.

The use of type I detector allows gamma sources to be identified through their energy spectrum and gamma line emission. Furthermore, starting from the energy of the gamma radiation of the identified masking source and from the knowledge of the Klein-Nishina distribution for each gamma emission, it is possible to obtain normalized templates of the spectral distribution of the type II detector: $KN_i^{Isot,j}$ where i is the spectral channel index, Isot identifies the identified isotope, j identifies the gamma emission lines of Isot.

From the count of each photopeak, from the photopeak efficiency measurement (cps/phi) of the type I detector and from a measurement of the counting efficiency of the type II detector it is possible to obtain a multiplicative factor that estimates the contamination in the gamma spectrum of the type II due to any masking sources:

$$n_{Tot}^{EJ309} = \frac{n_{Peak}^{Inor.} \times eff_{Tot}^{EJ309}}{eff_{Peak}^{Inor.}}$$

The coefficients $eff_{Tot}^{EJ309}$ and $eff_{Peak}^{Inor.}$ can be determined, for example, using the Montecarlo method and then verified or weighed through experimental measurements with some certified sources.

The sum of the distributions obtained by multiplying the term $n_{Tot}^{EJ309}$ by the corresponding normalized Klein-Nishina distribution, gives the expected gamma distribution of the masking source measured by the type II detector:

$$Bkg_i=\Sigma_{Isot}\Sigma_j n_{Tot\ Isot,j}^{EJ309} \times KN_i^{Isot,j}$$

Once the contamination has been estimated, it is possible to subtract its contribution in the gamma spectrum of the type II measured and perform the identification as already implemented.

The Differences between the state of the art detection methods and detectors and the present invention method are summarized in the charts below:

| | Gamma count | Neutron count | Neutron identification | Gamma spectrum with nuclides identification | Use of multi-libraries for gamma identification optimization and simultaneous neutron identification optimization | Area/space definition by identification confidence level for SNM | Areas/spaces definition for SNM in the presence of both shielding and moderators | Masking correction through the use of the second spectrometric detector |
|---|---|---|---|---|---|---|---|---|
| State of the art | YES | YES | YES but with limits in specific conditions | NO | NO | NO | NO | NO |

-continued

| | Gamma count | Neutron count | Neutron identification | Gamma spectrum with nuclides identification | Use of multi-libraries for gamma identification optimization and simultaneous neutron identification optimization | Area/space definition by identification confidence level for SNM | Areas/spaces definition for SNM in the presence of both shielding and moderators | Masking correction through the use of the second spectrometric detector |
|---|---|---|---|---|---|---|---|---|
| Present invention | YES | YES | YES | YES | YES | YES | YES | YES |

| | State of the art | Present invention |
|---|---|---|
| Gamma count | YES | YES |
| Neutron count | YES | YES |
| Neutron identification | NO but with limits in specific conditions | YES |
| Gamma spectrum with nuclides identification | YES | YES |
| Use of multi-libraries for gamma identification optimization and simultaneous neutron identification optimization | NO | YES |
| Area/space definition by identification confidence level for SNM | NO | YES |
| Areas/spaces definition for SNM in the presence of both shielding and moderators | NO | YES |
| Masking correction using the second spectrometric detector | NO | YES |

| Feature | Gamma detection device | Gamma-neutron device | Present Invention |
|---|---|---|---|
| Gamma counting | ✓ | ✓ | ✓ |
| 1 s gamma alarm for minimum dose rate of | 500 nSv/h | 500 nSv/h | 50 nSv/h |
| Gamma identification in 1 minute | ✓ | ✓ | ✓ |
| Standard resolution of gamma detector | >6% | >6% | <3.5% |
| Max number of sources identified simultaneously | From 3 to 7 gamma sources | From 3 to 7 gamma sources | Gamma up to 7 neutron up to 2 |
| Max number of peaks detected correctly in gamma ID | 3-12 | 3-12 | Up to 16 |
| Neutron counting | x | ✓ | ✓ |
| 1 s neutron alarm for 20.000 n/s of Cf-252 at a distance of | x | 25 cm | 125 cm |
| 1 s neutron alarm for 20.000 n/s of Pu-239 at a distance of | x | 25 cm | 500 cm |
| 1 s neutron alarm for 20.000 n/s of Cf-252 with a shielding of HDPE of | x | 5 cm | 10 cm + 5 cm lead |
| 1 s neutron alarm for 20.000 n/s of Pu-239 with a shielding of HDPE of | x | 5 cm | 10 cm + 5 cm lead |
| Identification of neutron source in 1 minute | x | x | ✓ |
| Identification of SNM with shielding, masking, or moderation | x | x | ✓ |
| Application example | Gamma detection device | Gamma-neutron device | Present Invention |
| Detection of common gamma sources (Co-60, Cs-137, I-131) | ✓ | ✓ | ✓ |
| Identification of common gamma sources (Co-60, Cs-137, I-131) | ✓ | ✓ | ✓ |
| Detection of SNM (gamma and neutron emitting material like U, Pu, Am/Be . . . ) | ✓ gamma x neutron | ✓ gamma ✓ neutron | ✓ gamma ✓ neutron |
| ID of SNM (gamma and neutron emitting material like U, Pu, Am/Be . . . ) | ✓ gamma x neutron | ✓ gamma x neutron | ✓ gamma ✓ neutron |

-continued

| Feature | Gamma detection device | Gamma-neutron device | Present Invention |
|---|---|---|---|
| Detection of SNM with only n or with shielded gamma (like Cf-252, U, Pu, Am/Be in a lead box) | x gamma<br>x neutron | x gamma<br>✓ neutron | x gamma<br>✓ neutron<br>extra info: shielded |
| ID of SNM with only n or with shielded gamma (like Cf-252, U, Pu, Am/Be in a lead box) | x gamma<br>x neutron | x gamma<br>x neutron | x gamma<br>✓ neutron |
| ID of SNM like previous point with masking with common gamma source (like I-131) | ✓ I-131<br>x SNM | ✓ I-131<br>x SNM | ✓ I-131<br>✓ SNM<br>extra info: masked |

The flow diagrams of enclosed FIG. 1-FIG. 4 show a flow chart of an embodiment of the method according to the present invention starting from the alarm event, the detection of a neutron source.

The method according to the present description is adapted to work correctly with any type I detector. Testing has been performed with many detectors, the measurement results and parametrization reported herein are related to the average resolution scintillator $CeBr_3$.

In an embodiment, the method according to the present description makes use of 2 gamma energy spectra [1.a)]: A first spectrum, $spec_1$ is obtained during the identification period (for example during 1 minute of data acquisition, but other durations can be chosen) and a second spectrum, $spec_2$ is equal to spec, with the subtraction of last environmental background (for example after 3 minutes of data acquisition but other durations can be chosen), properly rescaled. In addition, a Background is computed, and it is subtracted to $spec_2$ [2.a)]. An example of the algorithm steps is described hereinafter, wherein the values of the parameters and formulas employed are related to the specific choice of a CeBr3 type I detector. In general, these formulas and parameters can be changed depending on the choice of the type I detector. For instance, peak fit can be performed with Gaussian or Poisson fit, background can be calculated with a polynomial formula form degree zero to degree three or with a step-function.

1) Searching for Gamma Peaks on $Spec_2$

This can be done using a Search function [3.a)]. This function restricts the number of possible peaks through two parameters, σ and thr. The first one selects peaks based on their width (the smaller σ, the smaller peak width will be accepted). The second one discards peaks with amplitude less than thr·h, with h equal to the height of the highest peak. σ is set to 2, 5, and 7 spectrum channels (1channel=3 keV) respectively for the energy intervals [0, 330[, [330, 1100[and [1100, 5100[keV. thr is set to 0.0002.

2) $1^{st}$ validation of $spec_2$ peaks.

To be performed for each peak position, $p_{1,i}$, found at step 1). Fitting, for example through Gaussian fit [4.a)] is performed within the energy interval $[a_i; b_i]$, with $a_i=p_{1,i}-5/3\ \sigma_t(p_{1,i})$, $b_i=p_{1,i}+5/2\sigma_t(p_{1,i})$ and $\sigma_t(p_{1,i})$ the theoretical resolution value, expressed in standard deviation, at the energy $p_{1,i}$ (if $(b_i-a_i)<40$ keV, then $a_i=p_{1,i}-11$ keV and $b_i=p_{1,i}+10$ keV). Standard deviation, $\sigma_i$, centroid, $E_i$ and Gaussian integral, $Int_i$, are retrieved from the fit, discarding immediately those peaks with non-physical values ($E_i$ or $Int_i$ negative, $E_i<a_i$, $E_i>b_i$, $E_i>5100$ keV) or with $Int_i<30$ counts [5.a)].

Then peak energy resolution, $FWHM_i=2\sqrt{2\ln(2)}\cdot\sigma_i$, is checked. Peak at energy $E_i$ is discarded in the following cases:

$$FWHM_i>FWHM_{max}(E_i) \text{ or } FWHM_i<FWHM_{min}(E_i)$$

with $$FWHM_{max}(E_i)=1.65\cdot FWHM_t(E_i)$$

$$FWHM_{min}(E_i)=0.56\cdot FWHM_t(E_i)$$

An offset equal to $0.03E_i$ is added to $FWHM_{max}(E_i)$ if $E_i<70$ keV. $FWHM_t(E)$ is the theoretical resolution value (expressed as FWHM [key]) at energy E, equal to $$FWHM_t(E) = \sqrt{-4.563094418\cdot 10^{-5}E^2 + 1.203082155E + 9.365215638}$$

Clearly $\sigma_t(E)$ is equal to $FWHM_t(E)/2\sqrt{2\ln(2)}$.

3) $2^{nd}$ validation of $spec_1$ peaks. Gamma spectrum is switched from $spec_2$ to $spec_1$, and a second validation is performed on the gamma energy spectra $spec_1$. A fitting procedure is performed [6.a)], for instance with a function defined as $$f(E)=Gauss(E; E_{i,f}, \sigma_{i,f}, Int_{i,f})+m\cdot E+q$$

within the energy interval $[E_{1,i}, E_{2,i}]$, with $E_{1,i}=E_i-3.5\ \sigma_t(E_i)$ and $E_2=E_i+3.5\ \sigma_t(E_i)$. In the fitted function, f(E), the Gaussian stands for the photopeak, while the last term, m·E+q, is a linear function for the estimation of the local background. Fitting parameters m, q, $\sigma_{i,f}$, $E_{i,f}$ are initialized in the following way:

m=$(c_{2,i}-c_{1,i})/(E_{2,i}-E_{1,i})$ with $c_{2,i}$ and $c_{1,i}$ as the spectrum counts at the energies $E_{2,i}$ and $E_{1,i}$, respectively;

q=$c_{1,i}-(m\cdot E_{1,i})$;

$\sigma_{i,f}$, $E_{i,f}$ with the parameters got from the previous fit, $\sigma_i$ and $E_i$.

Furthermore, assuming $y_1=m\cdot E_i+q$ and $y_2=m\cdot E_2+q$, if $y_1$ or $y_2$ are negative the fitting procedure is iterated for a maximum of 5 attempts, forcing fitting parameters to these constraints:

1. if $y_1<0$ and $y_2<0 \rightarrow m=0$, q=0;
2. if $y_1<0$ and $y_2\geq 0 \rightarrow max(m)=1.01\cdot y_2/(E_2-E_1)$ counts/keV, both m and q initialized to 0;
3. if $y_1\geq 0$ and $y_2<0 \rightarrow min(m)=-1.01\cdot y_1/(E_2-E_1)$ counts/keV, both m and q initialized to 0;

Peaks with a negative value of $Int_{i,f}$ or with $E_{i,f}$ outside $[E_{1,i}, E_{2,i}]$ are immediately discarded. At this point [7.a)], the integral, $S_i$, of the Gaussian Gauss (E; $E_{i,f}$, $\sigma_{i,f}$, $Int_{i,f}$) and the integral, $B_i$, of the linear background m·E+q are computed within the energy interval [$E_{min,i}$, $E_{max,i}$], with $E_{min,i}=E_{i,f}-3.5\ \sigma_{i,f}$ and $E_{max,i}=E_{i,f}+3.5\ \sigma_{i,f}$. These two values are used to reject false peaks, that would otherwise be detected due to statistical fluctuations. Another parameter called "significance", $Sig_i$ is computed. This parameter is equal to $S_i/\sqrt{(S_i+B_i)}$, that is the ratio between the signal integral, $S_i$, and the statistical uncertainty of total counts within [$E_{min,i}$, $E_{max,i}$]: peaks with $Sig_i<6$ are rejected [8.a)]. It is also computed the parameter Sig/ch (it will be used later, see point 5), that is the ratio between Sig and the number of spectrum channels included in same energy range [$E_{min,i}$, $E_{max,i}$].

Finally the last check on peak energy resolution, $FWHM_{i,f}=2\sqrt{2\ln(2)}\sigma_{i,f}/E_{i,f}$, rejects those peaks with $FWHM_{i,f}>FWHM_{max}(E_{i,f})$ or $FWHM_{i,f}<FWHM_{min}(E_{i,f})$, where $FWHM_{max}(E_{i,f})=1.25\cdot FWHM_t(E_{i,f})$ $FWHM_{min}(E_{i,f})=0.60\cdot FWHM_t(E_{i,f})$ An offset value equal to $0.07\cdot E_{i,f}$ is added to $FWHM_{max}(E_{i,f})$ if $E_{i,f}<70$ keV.

4) Searching for further peaks (second cycle of steps 2 and 3). First of all, every Gaussian function (that one at energy $E_i$, got at point 2) related to all gamma peaks previously not rejected is subtracted1 from both $spec_1$ and $spec_2$ (subtraction within the energy interval $[0.5\cdot E_{min,i}, 1.5\cdot E_{max,i}]$) [9.a)]. Then points 1), 2), and 3) are repeated using the updated spectra, $spec_1$ and $spec_2$, and a different set of parameters for the Search function. Now $\sigma$ is set to 10 and 12 spectrum channels, respectively for the energy intervals [0, 1100[and [1100, 5100[keV, and thr is set to 0.006.

The reason for this operation is to improve the identification capability of the algorithm. The subtraction of the peaks makes it possible to also recognize some peaks that would not be separated enough (e.g., $^{22}$Na 1275 keV and $^{60}$Co 1332 keV, see FIG. 1).

5) Integrals within the Region of Interest (ROI) 180-243 keV. Two integrals, $P_{208}$ and $B_{208}$, are computed within the energy interval [180 keV, 243 key] to possibly evaluate $^{239}$Pu enrichment grade [4.c)] (higher values of $P_{208}/B_{208}$ should indicate the presence of a greater contribution from $^{241}$Pu isotope). $P_{208}$ and $B_{208}$ are computed as the number of total counts within the ROI using $spec_2$ and Background (the same one subtracted to $spec_2$, at the beginning), respectively [10.a)].

6) Multiplets searching. For each peak at energy $E_{i,f}$ detected at the end of 4), the algorithm looks for those peaks, at energy $E_{j,f}$ (with $E_{i,f}>E_{j,f}$), such that $E_{i,f}-E_{j,k}<6.5\cdot\sigma_{i,f}$. In this case [11.a)], both 2 peaks at $E_{i,f}$ and $E_{j,f}$ are discarded and point 3) is repeated analogously. The only difference is the fitting function, defined as $f(E)=Gauss_i(E;E_{i,f},\sigma_{i,f})+Gauss_j(E;E_{j,f},\sigma_{j,f})+m\cdot E+q$ Function parameters of both $Gauss_i$ and $Gauss_j$ are initialized with the respective ones got at the end of the fitting procedure described at point 2), while m and q are initialized as described in 3), with the fitting energy interval equal to [$E_{1,i}$, $E_{2,j}$]. Also the validation procedure is the same one described at 3) for both peaks at $E_{i,f}$ and $E_{j,f}$.

7) Rejection of possible duplicated peaks. Each couple of peaks whose energies, $E_{i,f}$ and $E_{j,f}$ respectively (with $E_{i,f}>E_{j,f}$), differ by less than $1.0\cdot\sigma_{i,f}$ is discarded. These two peaks are replaced by a new peak whose parameters ($E_{i,f}$, $\sigma_{i,f}$, $Int_{i,f}$, Sig, Sig/ch) are computed as the average of the respective parameters of the two peaks discarded [12.a)];

8) Compton edge and backscatter peak identification. Theoretical Compton edge, $E_C$, and backscatter peak, $E_{BS}$, are computed for each identified peak with energy $E_{i,f}>200$ keV. Then, for each peak at the energy $E_{j,f}$ ($E_{j,f}<E_{i,f}$), assuming $\sigma_t(E_{j,f})$ as its theoretical resolution value ($\sigma_t(E)=FWHM_t(E)/2.354820045$), its distances from $E_C$ and $E_{BS}$ are respectively evaluated as $d_C=|(E_{j,f}+\sigma_t(E_{j,f}))-E_C|$ $d_{BS}=|E_{j,f}-E_{BS}|$ where the addition of $\sigma_t(E_{j,f})$ to $d_C$ is made to take into account energy shift due to the finite resolution of the detector. So peak $E_{j,f}$ is considered the Compton Edge related to the photo-peak $E_{i,f}$ and it is discarded if the following relation are true:

$d_C<1.0\cdot\sigma_t(E_{j,f})$ $H_r<0.08 \land (R_r>1.1 \lor Sig/ch_j<0.25)$ where $H_r$ is the ratio of peak heights (peak j-th over peak i-th) and $R_r$ is the ratio $\sigma_{j,f}/\sigma_t(E_{i,f})$. On the other hand, peak $E_{j,f}$ is considered the backscatter peak related to the photo-peak $E_{i,f}$ if $d_{BS}<1.5\cdot\sigma_t(E_{j,f})$ and $H_r<0.08 l \land R_r>1.05$ In this case, the backscatter peak $E_{j,f}$ is not rejected but its index, j, is stored in memory for the subsequent analysis [13.a)].

9) Source identification. At this point a set of peak positions, $E_i$ (i.e., all $E_{i,f}$ detected at the end of 8), i=1, ... N, with N=number of peaks previously detected, is available. The algorithm compares these values with the known peaks of gamma sources saved in a library, $p_{j,h}$, j=1, ... M, M=number of known sources, h=1, ... H, H=number of peaks belonging to the j-th known gamma source, $s_j$.

For each $s_j$, $p_{j,h}$ is identified with $E_i$ if the latter is the nearest of all $E_i$ to $p_{j,h}$ and if $|E_i-P_{j,h}|<1.5\cdot\sigma_i$, with $\sigma_i=\sigma_{i,f}$ of the i-th peak. If n peaks are identified, n>0, two parameters, Sig and Sig/ch, are computed as the averages over n of Sig and Sig/ch (described in 3). Then another parameter, $\chi$, is introduced to consider the identification quality of $s_j$. It is computed as:

$$\chi = \frac{L}{n} \cdot \sum_{\substack{p_{j,h}\ identified \\ i=0}}^{n} \left(\frac{E_{id,i} - p_{j,h}}{p_{j,h}}\right)^2$$

where $E_{id,i}$ is the $E_i$ related to the identified known peak $p_{j,h}$.

[14.a)] Finally, $s_j$ gamma source is identified if the following conditions are true:
$\chi<0.002$
$Sig/ch \geq 0.17$
$n/L \geq 0.59$ Furthermore, an empirical "confidence value", CL, is associated with the identified source. It is defined as CL=min(CL$_1$,CL$_2$), where:

$$CL = \begin{cases} 1 & \text{if } \chi < 0.0002 \\ 0.90 & \text{if } 0.0002 \leq \chi < 0.0003 \\ 0.80 & \text{if } 0.0003 \leq \chi < 0.0004 \\ 0.70 & \text{if } \chi \leq 0.0004 \end{cases}$$

-continued $$CL_2 = \begin{array}{l} 1 \text{ if } \overline{Sig/ch} \geq 0.30 \\ 0.90 \text{ if } 0.25 \leq \overline{Sig/ch} < 0.30 \\ 0.80 \text{ if } 0.20 \leq \overline{Sig/ch} < 0.25 \\ 0.70 \text{ if } \overline{Sig/ch} < 0.20 \end{array}$$

In the end [15.a)] the name, $S_j$, of the identified source $s_j$ is replaced by the string "Backscatter (possible $S_j$ masked)" if $(n-n_{BS})/L<0.59$, assuming $n_{BS}$ as the number of backscatter peaks detected in 8) and belonging to $S_j$.

10) Minor source identification. Step 9, is repeated for a total of L times, with L=number of libraries of gamma sources, in descending order or priority. For each iteration, every peak $E_{id,i}$, related to each identified source $s_j$, is removed from the set $E_i$ before the next repetition of the source identification routine [16.a)]. The library is made as follows (from left to right: source name, source type and gamma energies in keV between square brackets):

library 1:
Am-241 Industrial [59.5409]
Ba-133 Industrial [80.8966, 302.8508, 276.3989, 356.0129, 383.8485]
Co-56 Industrial [846.75, 511.0, 1238.26, 1771.40]
Co-57 Medical [122.06065]
Co-60 Industrial, Medical [1173.228, 1332.492]
Cs-137 Industrial, Medical [661.657]
Eu-152 Industrial, Medical [121.78, 344.27, 778.9045, 963.38, 1112.076, 1407.95]
K-40 NORM [1460.822]
Mn-54 Industrial [834.848]
Na-22 Medical [511.0, 1274.537]
Pu-241 SNM [103.68, 208.0, 332.376]
Pu-239 SNM [56.0, 375.05, 413.71]
Ra-226 NORM [295.21, 351.92, 609.31, 1764.49]
Th-232 NORM [238.63, 338.3, 583.0, 911.07, 968.0, 2614.66]
U-235 SNM [143.767, 185.72]
U-depleted, natural or LEU SNM [1001.026, 766.361]
Y-88 Industrial, Medical [898.042, 1836.07]
library 2:
Ag-108m Industrial [433.93, 614.37, 722.95]
Ag-110m Industrial [657.75, 884.67, 937.48, 1384.27]
Au-198 Industrial [411.80]
Ba-133 Industrial [80.8966, 302.8508, 356.0129]
Ba-140 Industrial [537.38]
Be-7 NORM [477.61]
Bi-207 Industrial [569.70, 1063.66]
Co-56 Industrial [846.75, 1238.26, 1771.40]
Co-60 Industrial, Medical [1173.228]
Cs-134 Industrial [569.32, 604.70, 795.85]
Eu-152 Industrial, Medical [121.78, 344.27, 963.38, 1407.95]
Ga-67 Medical [93.31, 184.58, 300.23]
Hg-203 Industrial [279.20]
Ir-192 Industrial, Medical [295.96, 308.46, 316.51, 468.07]
La-138 Industrial, Medical [788.74, 1435.80]
La-140 Industrial [487.03, 815.83, 1596.49]
Lu-177 Medical [112.9498, 208.3662]
Mo-99 Medical [739.50, 140.51]
Na-22 Medical [511.0]
Nd-147 Industrial [91.11, 531.03]
Pb-203 Medical [279.20]
Ru-103 Industrial [497.08]
Ru-106 Industrial, Medical [511.85, 621.84]
Sb-124 Industrial [602.72, 722.78, 1691.02]
Sb-125 Industrial [427.89, 600.56, 635.90]
Sc-46 Industrial [889.28, 1120.55]
Sn-113 Industrial, Medical [391.69]
Ta-182 Industrial [1121.28, 1189.04, 1221.42]
U-235 SNM [185.72]
Yb-169 Industrial, Medical [130.52, 177.21, 197.95]
Zr-95 Industrial [724.20, 756.73]
library 3:
I-131 Medical [364.48]
U-depleted, natural or LEU SNM [1001.026]
Zn-65 Industrial [1115.55]

Merging of gamma (type I detector data) and neutron (type II detector data) source identifications Before producing the final identification result to the user, the results of both gamma and neutron source identifications, a) and b), are compared [1.c)]. The first one is performed in case of gamma and/or neutron alarm [1.a)] while the latter is performed whenever a neutron alarm occurs [1.b)].

At the end of a) a set of identified sources, $S^{\gamma}_m$, (m=1, . . . k, where k=number of identified sources) is available. As described in point 9) and 10) above, each source in this set is described by type, CL value, Sig parameter and library number, I. On the other hand, b) returns a neutron source, $S^n$, with its own CL value as result. $S_n$ can be equal to only one of the following sources: "Cf-252", "Pu", "U", "AmBe" and "AmLi" (or equal to "Unknown" if the algorithm fails to identify the source). This algorithm can also distinguish shielded sources [7.b)], more specifically the following case:

Cf-252 shielded with a neutron moderator.
Cf-252, Pu and AmBe shielded with Pb.

The merging of gamma and neutron source identification consists in the following operations:

1. validation of AmLi source. This gamma and neutron source is identified correctly only if $S^n$="AmLi" and at least two sources among "U-235", "Be-7" and "Cs-137" belong to $S^{\gamma}_m$. In this case [2.c)], "U-235", "Be-7" and "Cs-137" are removed from the set $S^{\gamma}_m$ and $S^n$ is still "AmLi", otherwise $S^n$ is set to "Unknown" [3.c)].
2. masking condition determination for neutron sources and warning about $S^n$ masked with gamma source. The word "masked" is appended to $S^n$ name if $S^n$ is not "Unknown" and there is at least one gamma source in $S^{\gamma}_k$ that is different from $S^n$ [4.c)].
3. identification of Na-22/Co-60 with a higher counting rate of Co-60/Na-22. It is possible that only 1 out of 2 peaks of Na-22/Co-60 is detected when one of these gamma sources is more intense than the other one, because of the finite resolution of the detector. For this reason, Na-22 and Co-60 have been added also in the $2^{nd}$ library with only one peak (511 keV and 1173 keV for Na-22 and Co-60, respectively). In this way both the two sources will be identified when Na-22/Co-60 is identified from the $2^{nd}$ library and Co-60/Na-22 from the $1^{st}$ one [7.c), 8.c)]. Possible Ru-103 source in $S^{\gamma}_m$ is removed from the identified sources when Na-22 and Co-60 are identified from the $2^{nd}$ and the $1^{st}$ library, respectively.
4. estimation of Pu-239 enrichment grade. This step is performed if at least one isotope of Pu, Pu-n, is identified by a) and no other gamma source, with gamma peaks between 180 and 243 keV, belongs to $S^{\gamma}_m$ (according to the current library: Ga-67, Lu-177, Th-232, U-235, Yb-169). In this case (5.c)), Pu-239 enrichment grade is defined by the following 5 classes, based on the ratio $P_{208}/B_{208}$ that has been computed by the gamma source identification algorithm (point 5) above):

i. Weapon Grade Pu (WGPu) if S″=Pu, "Pu-239" belongs to $S^{\gamma}_m$ and P208/B208<0.11. The word "WGPu" is appended to the source name of S″.
ii. 80-90% enriched if "Pu-239" belongs to $S^{\gamma}_m$ and 0.11≥P208/B208<0.18. The string "80-90% Pu-239" is appended to the source name of S″.
iii. 65-80% enriched if 0.18≤P208/B208<0.31. The string "65-80% Pu-239" is appended to the source name of S″.
iv. 55-70% enriched if 0.31≤P208/B208<0.45.s. The string "55-70% Pu-239" is appended to the source name of S″.
v. <60% enriched if $P_{208}/B_{208}$≥0.45. The string "<60% Pu-239" is appended to the source name of S″.

Final enrichment grade is reduced by 10% in two cases [6.c)]: if S″ is identified as a shielded source or if the ratio $Sig_\gamma/Sig_{Pu}$ is smaller than 1.0, assuming $Sig_\gamma$ as the maximum value of Sig parameter among all gamma sources in $S^{\gamma}_m$ (excluding Am-241 and Pu-n) and $Sig_{Pu}$ as the corresponding value for Pu sources in $S^{\gamma}_m$.

The present invention also includes the identification of SNM in conditions of scenarios with the presence of shielding and masking, i.e., typically scenarios that could be considered in potential terrorist action or in the presence of nuclear "smuggling" situations.

The system analyzes in real time like in a chart, where the ratio $R_C$ between the gamma and neutron counts is shown in the x-axis, and the ratio $R_E$ between the average energy of the gammas and that of the neutrons is shown in the y-axis.

Figure 5:
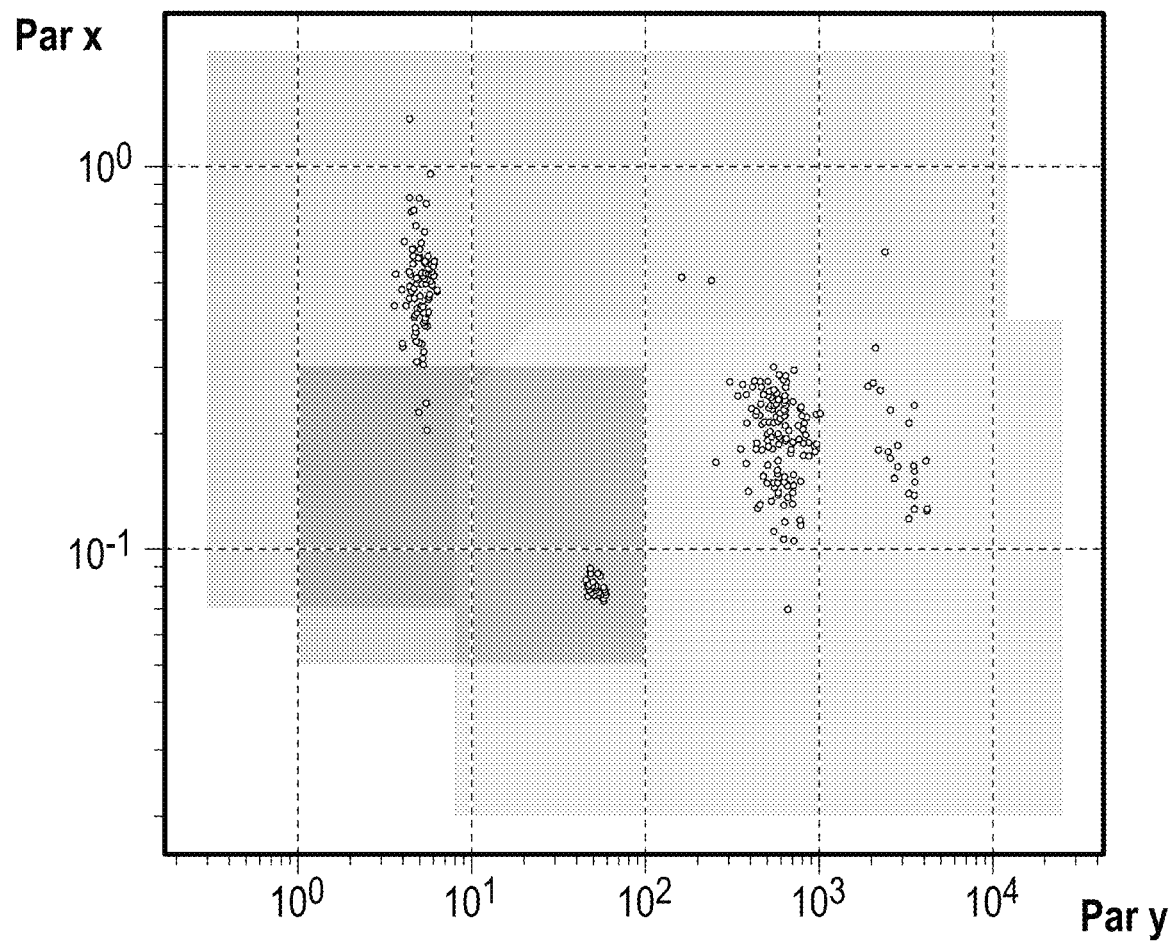
FIG. 5 illustrates a chart of SNM identification experimental results with no masking and no shielding wherein each point represents a 1 min measurement. The clusters of the measurements fall in the center of the rectangular regions each corresponding to a specific SNM.
Figure 6:
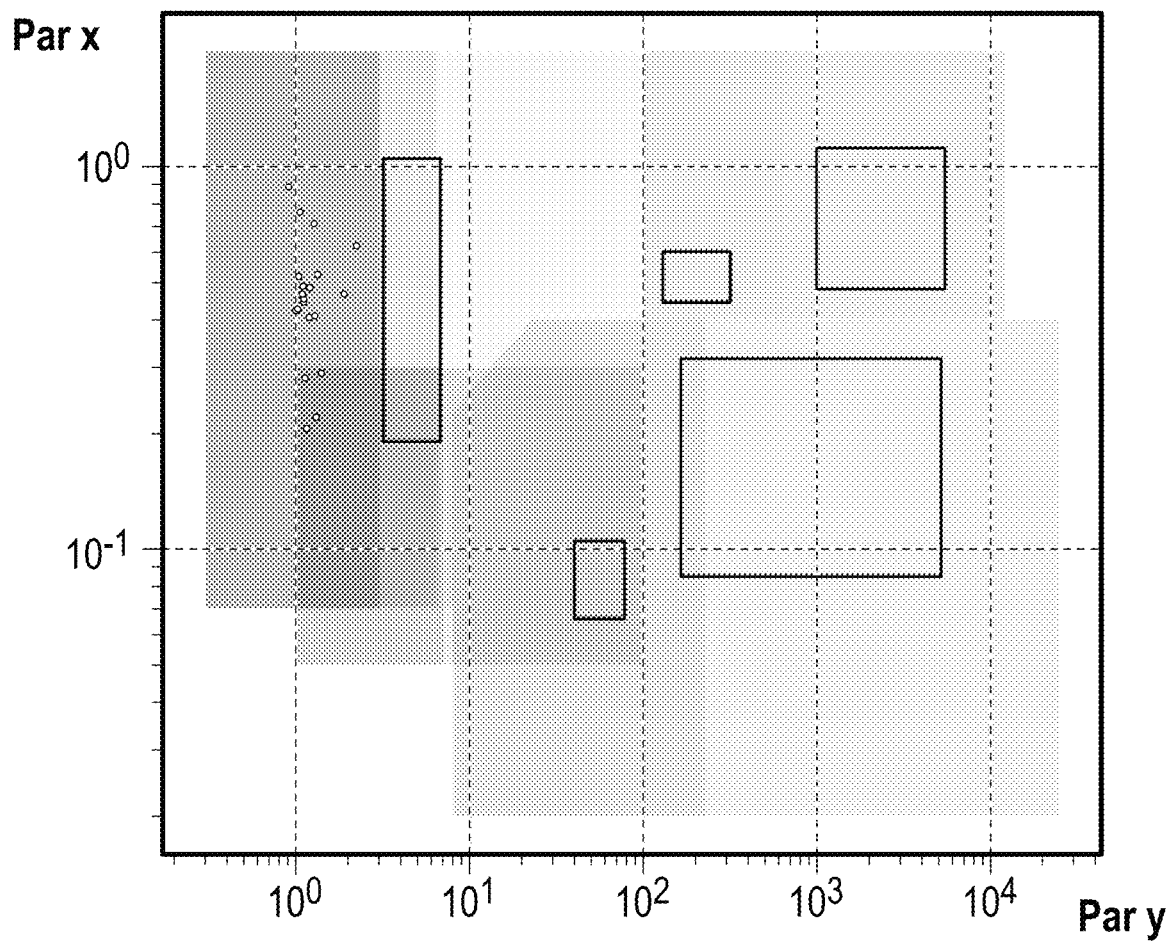
FIG. 6 illustrates a chart of Cf-252 identification experimental results with lead shield and no masking.
Figure 7:
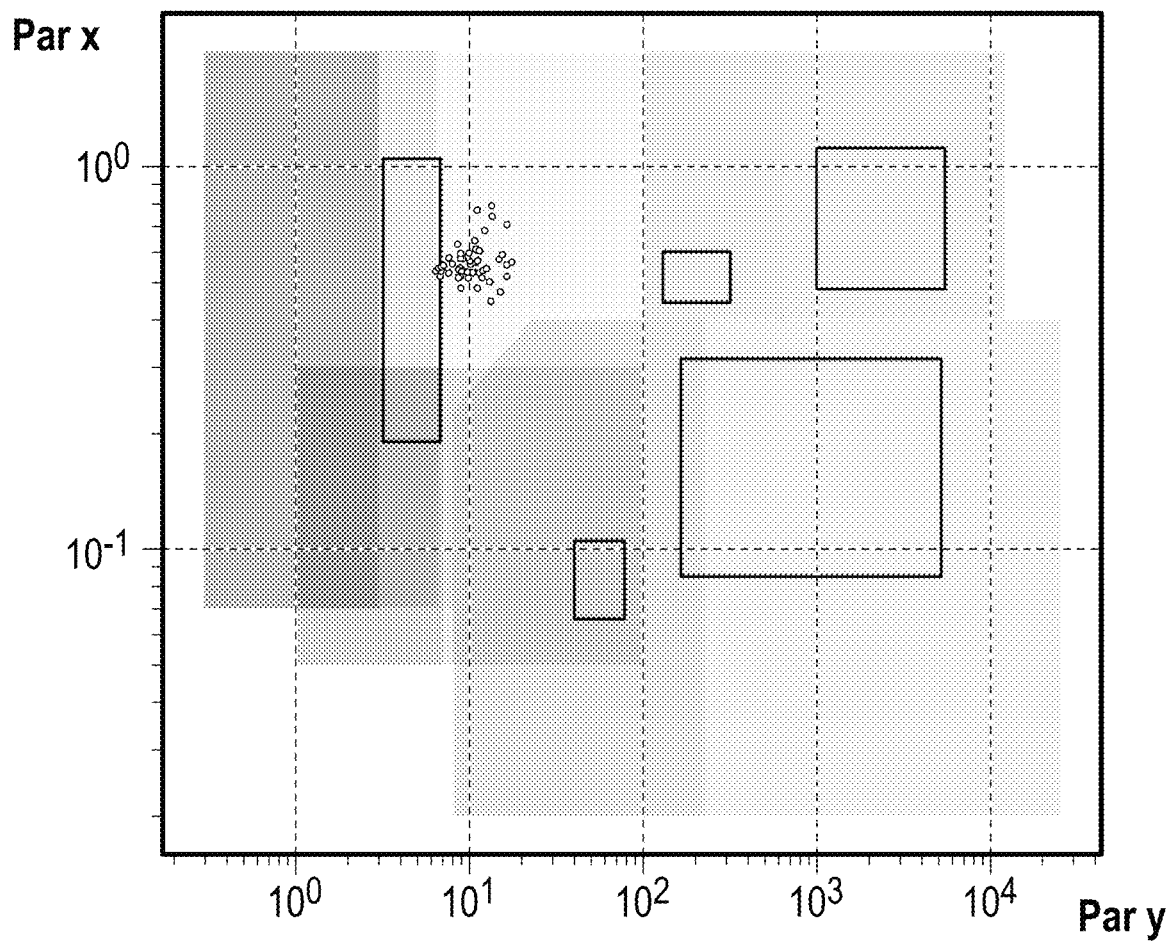
FIG. 7 illustrates a chart of Cf-252 identification experimental results with polyethylene (PE) shield and no masking.
Figure 8:
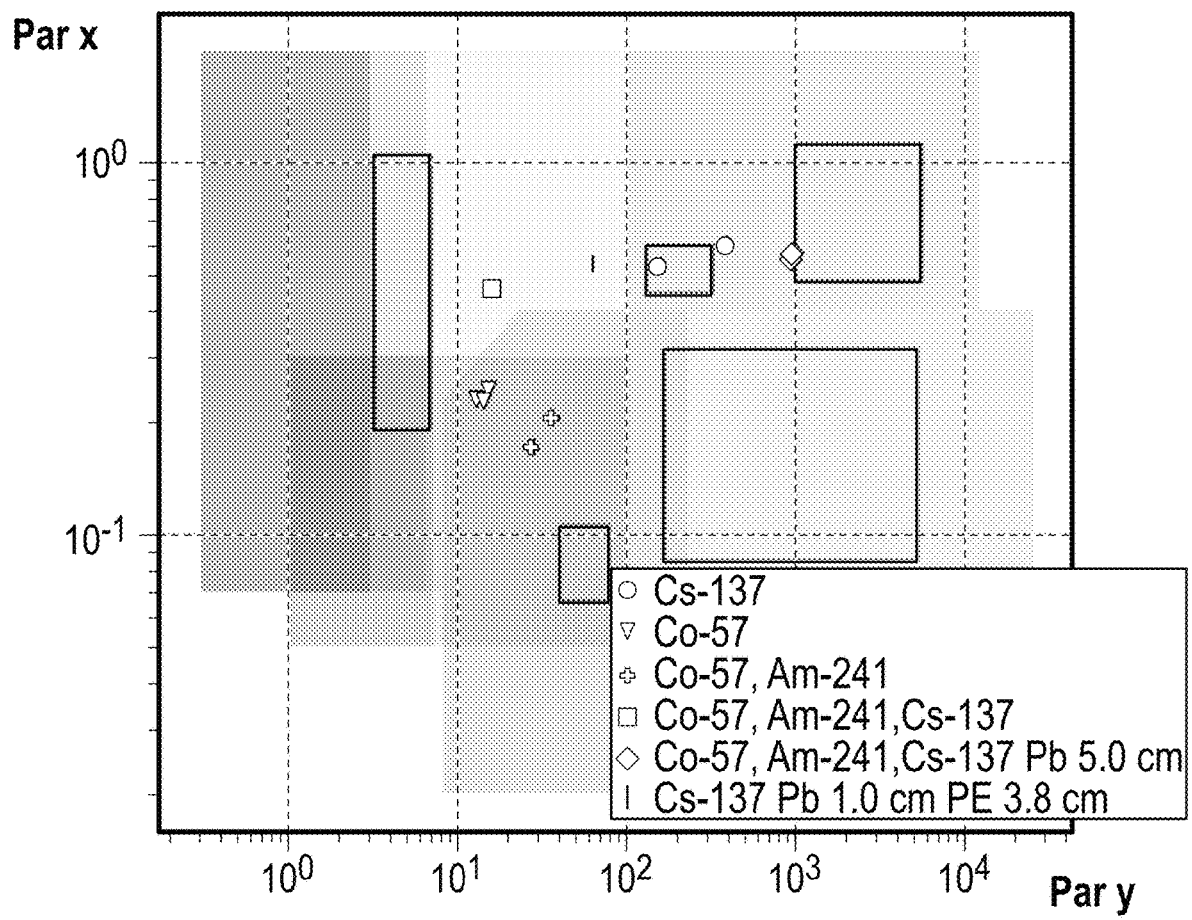
FIG. 8 illustrates a chart of Cf-252 identification experimental results with masking scenarios carried out with gamma sources with different intensities.

In this way it is possible to precisely determine the positioning of the source under observation in a rather well confinable space and therefore associable with that specific situation, as in the case of the enclosed FIG. 5, where the grouping or cluster of the points relating to Cf252 measurements can be seen without any presence of shielding and masking in well-defined areas which have been obtained. FIG. 6 shows the positioning of the points in the presence of lead shielding, FIG. 7 shows the presence of polyethylene (PE) neutron moderator shielding and FIG. 8 shows the presence of different sources to create masking scenarios for the neutron source which in this case are resolved by the method and system according to the present invention by virtue of the simultaneous spectroscopic evaluation.

Enclosed FIG. 9 to FIG. 17 summarize the experimental observations using the algorithm for SNM identification according to the present invention.

Figure 9:
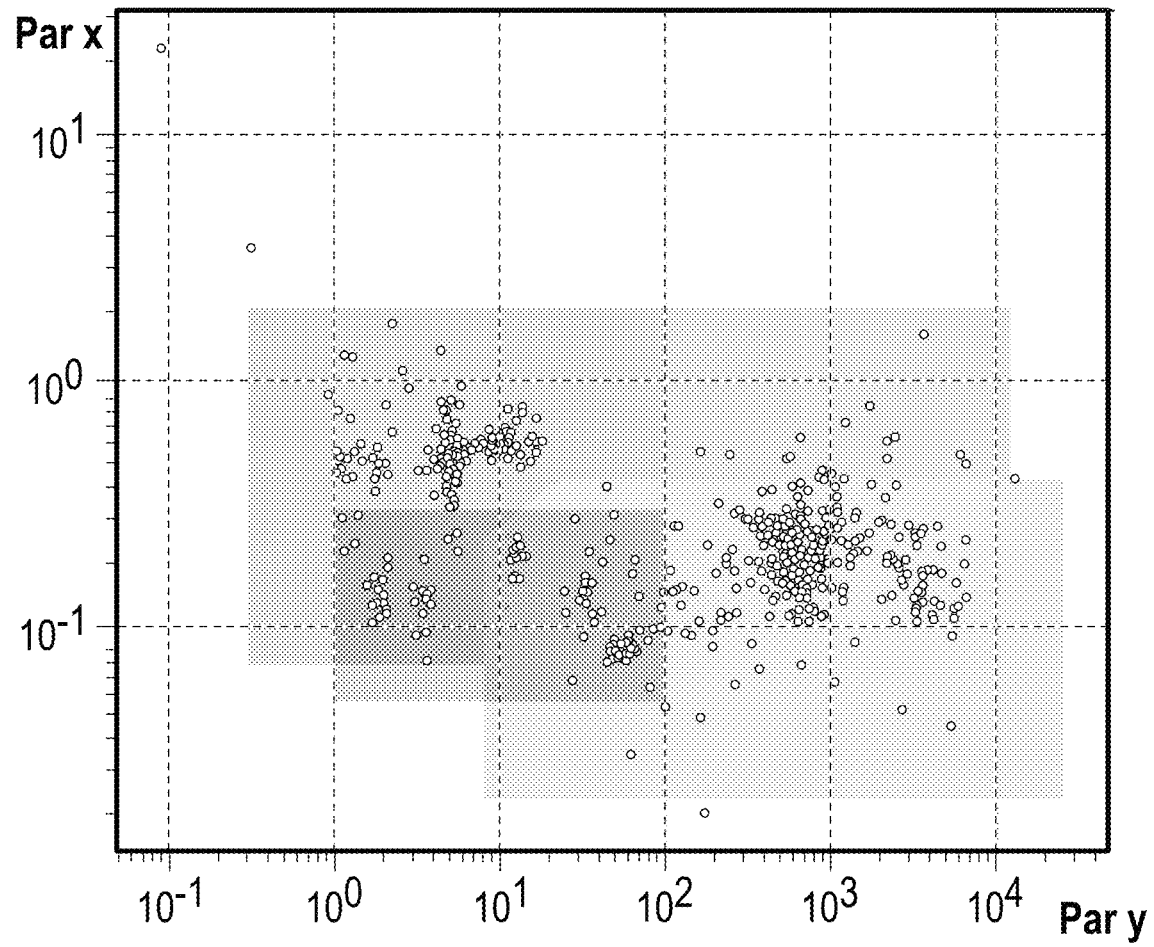
FIG. 9 illustrates a chart of the total results of the identification of all the SNMs in different measurement conditions. Points in blue, orange, green, red and purple respectively represent the measurements with sources of Cf-252, Pu, U, AmBe and AmLi.

FIG. 9 shows the plane distribution of all the identifications (data: ENEA, Legnaro, Seibersdorf and measurements with AmLi, Oak Ridge). In each chart, the ratio $R_C$ between the gamma and neutron counts is shown in the x-axis, and the ratio $R_E$ between the average energy of the gammas and the neutrons is shown in the y-axis. These values are obtained during the identification, with the data obtained by the liquid scintillator (EJ-309) in the identification measurement (in this specific case of 1 min). In particular, the last saved spectrum (in this specific case of 3 min acquisition) of the ambient background, appropriately rescaled, is subtracted from the gamma energy spectrum. The boxes shown in the charts identify the regions in the plane $R_C$, $R_E$ in which to identify the different source types. For the identification of AmBe, since the relative box overlaps that of Cf-252 and Pu, the average neutron energy is used as the third parameter (AmBe if $E_n$>650 $keV_{ee}$).

Figure 10:
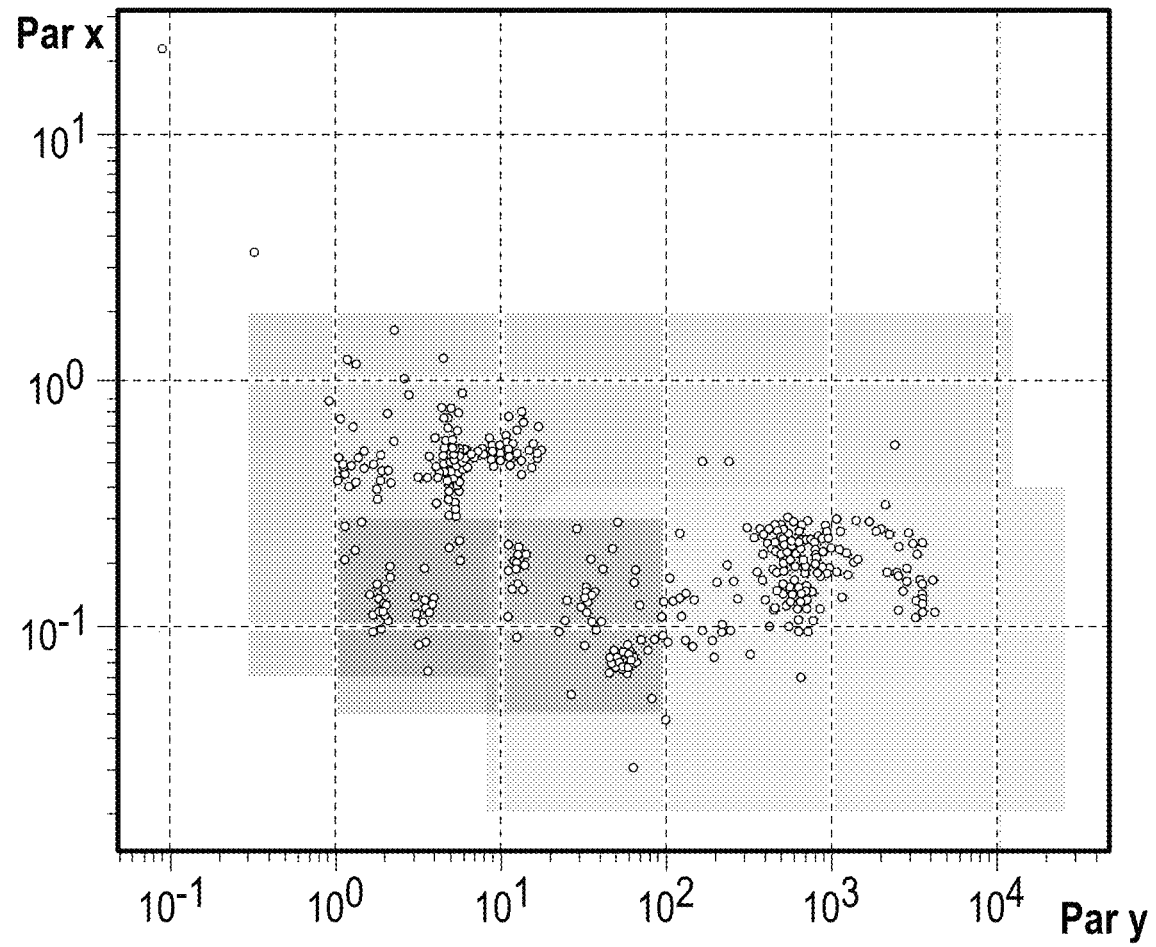
FIG. 10 illustrates the same chart of FIG. 9 with more than 8 neutrons per minute.

In the chart in FIG. 10, in fact, the measurements with a number of neutrons >8 cpm were selected. In this case, although the set threshold is less restrictive than that due to the alarm on the neutron cps (generally the alarm sounds when the neutrons exceed ~0.2 cps=12 cpm), the various sources are well separated in the corresponding regions. We can therefore say that the algorithm is also effective for low neutron counts, compatible with the background, and that, at present, the neutron alarm constitutes a more than sufficient condition for the correct recognition of a source. For example, in the case of U sources, it can be seen how the algorithm correctly identified the source including that made in Seibersdorf with HEU (90% U-235).

We can also observe the position of the 2 measurements with AmLi, placed between the boxes of Cf-252 and U.

Figure 11:
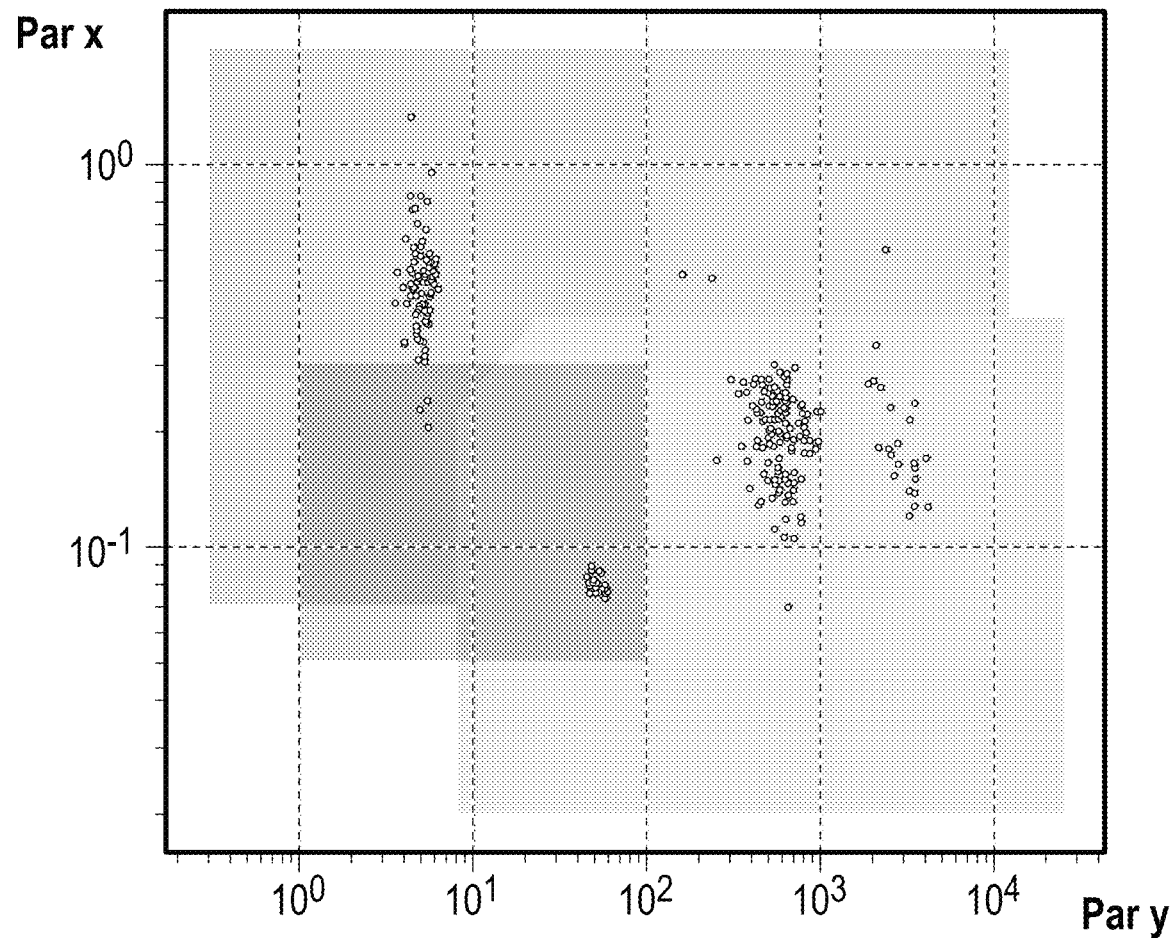
FIG. 11 illustrates the same chart of FIG. 9 with more than 8 neutrons per minute without shielding.

To better highlight the behavior of the algorithm with the different sources, FIG. 11 shows the results obtained with the sources only, without shielding material, with a number of neutrons >8 cpm.

From this chart the regions of the plane occupied by the different sources are evident[2]. Based on these data, regions have been defined with confidence level (CL)=100%.

Figure 12:
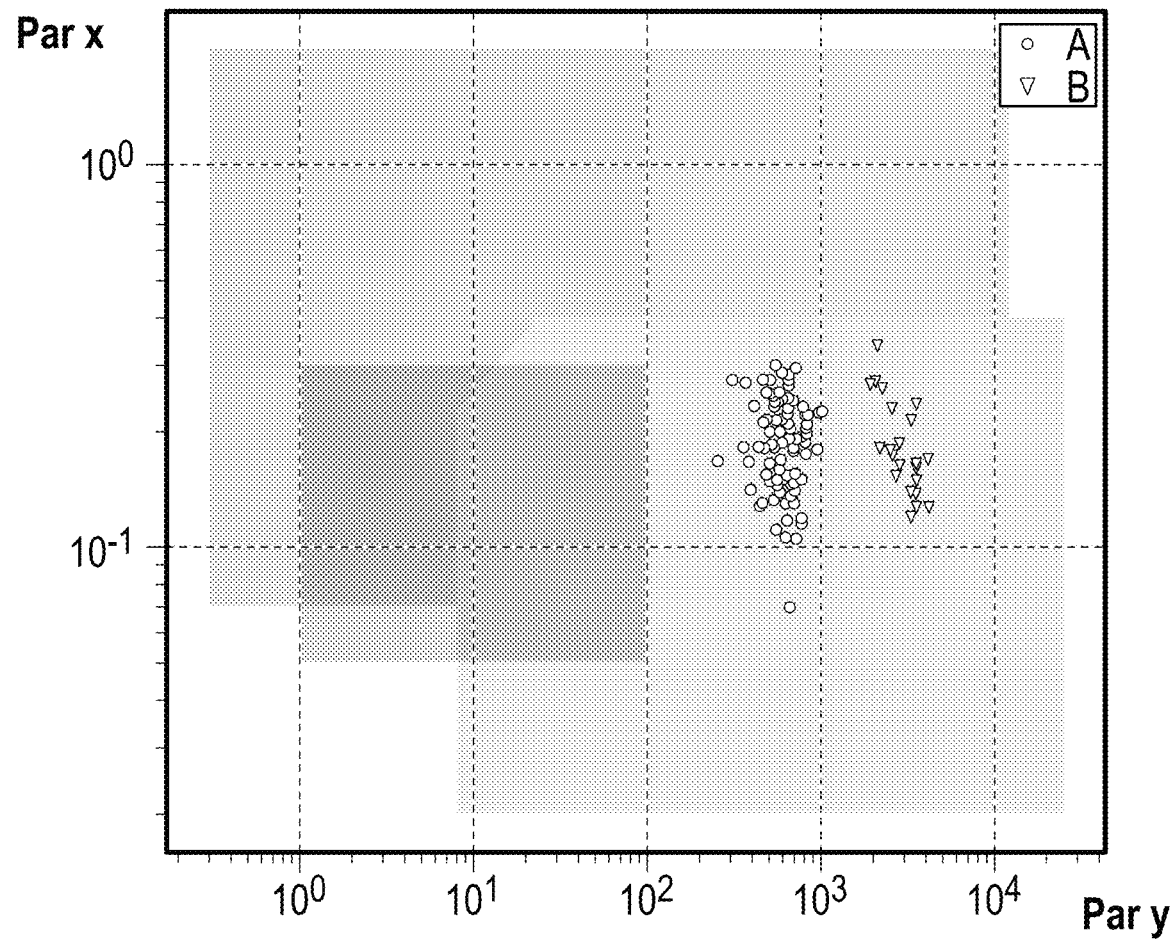
FIG. 12 illustrates a chart of repeated measurements n-times with two sources of PU with different enrichments at 60% and 70%.
Figure 13:
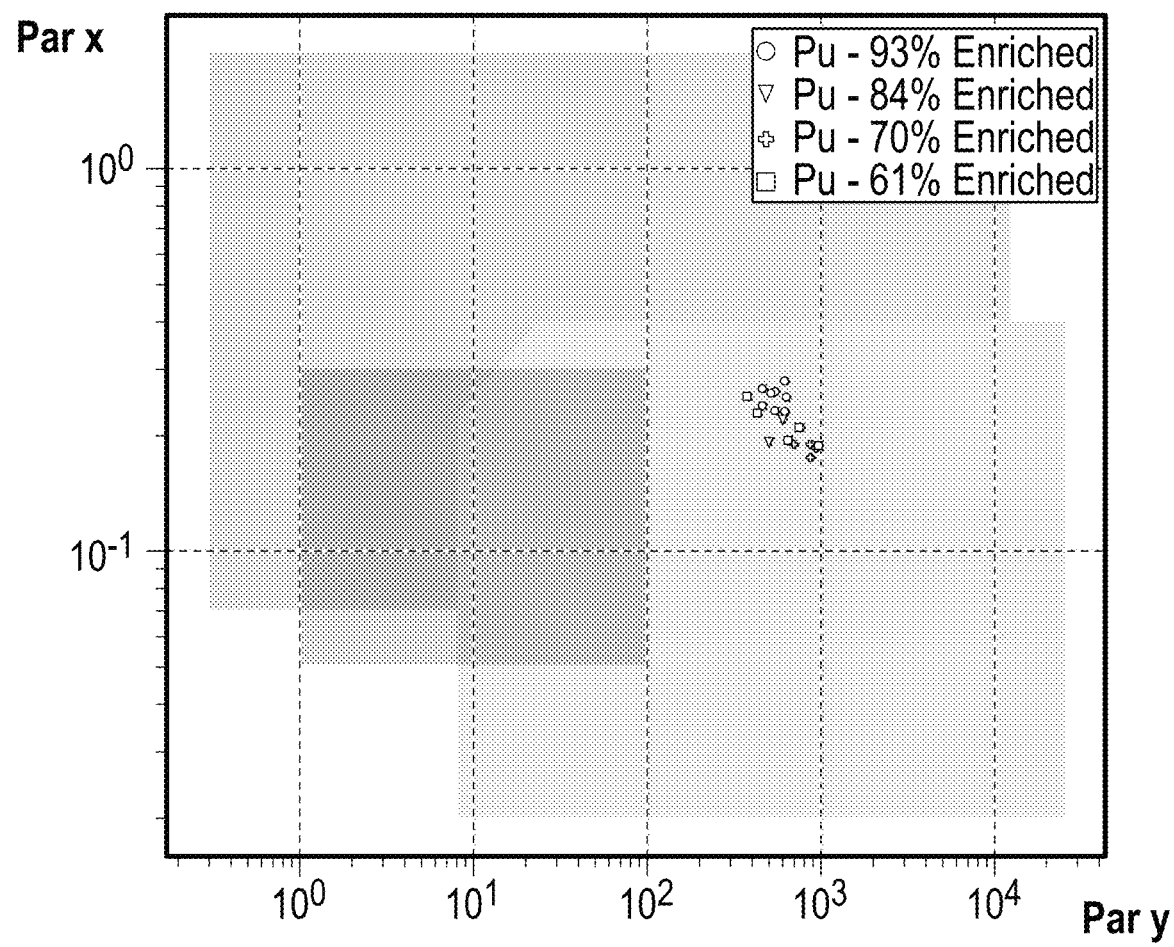
FIG. 13 illustrates a chart showing Pu with different degrees of enrichment without shielding and masking.

In the following charts, using the same conditions, FIG. 12 shows the Pu sources divided between CBNM side A and side B (ENEA—side A and B have different gamma emissions because the housing of the source has a side with thinner shielding) and FIG. 13 shows the Pu sources with different enrichment levels of Pu-239 (Seibersdorf).

From what can be seen in the chart in FIG. 13, also considering the absence of shielding and external masking sources, the well-defined positioning of the Pu with different levels of enrichment can be seen.

Figure 14:
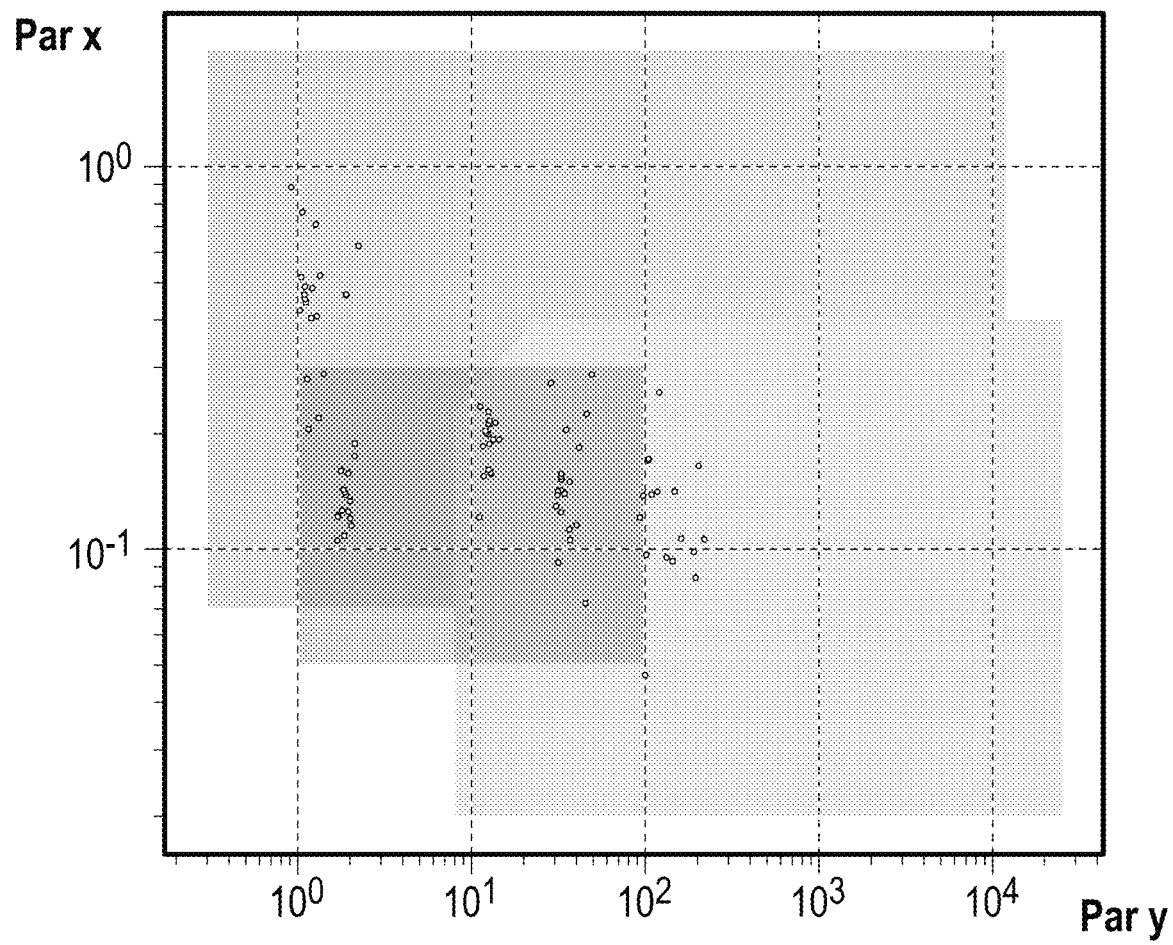
FIG. 14 illustrates a chart of a selection from the chart of FIG. 9 showing identifications with sources shielded by Pb.
Figure 15:
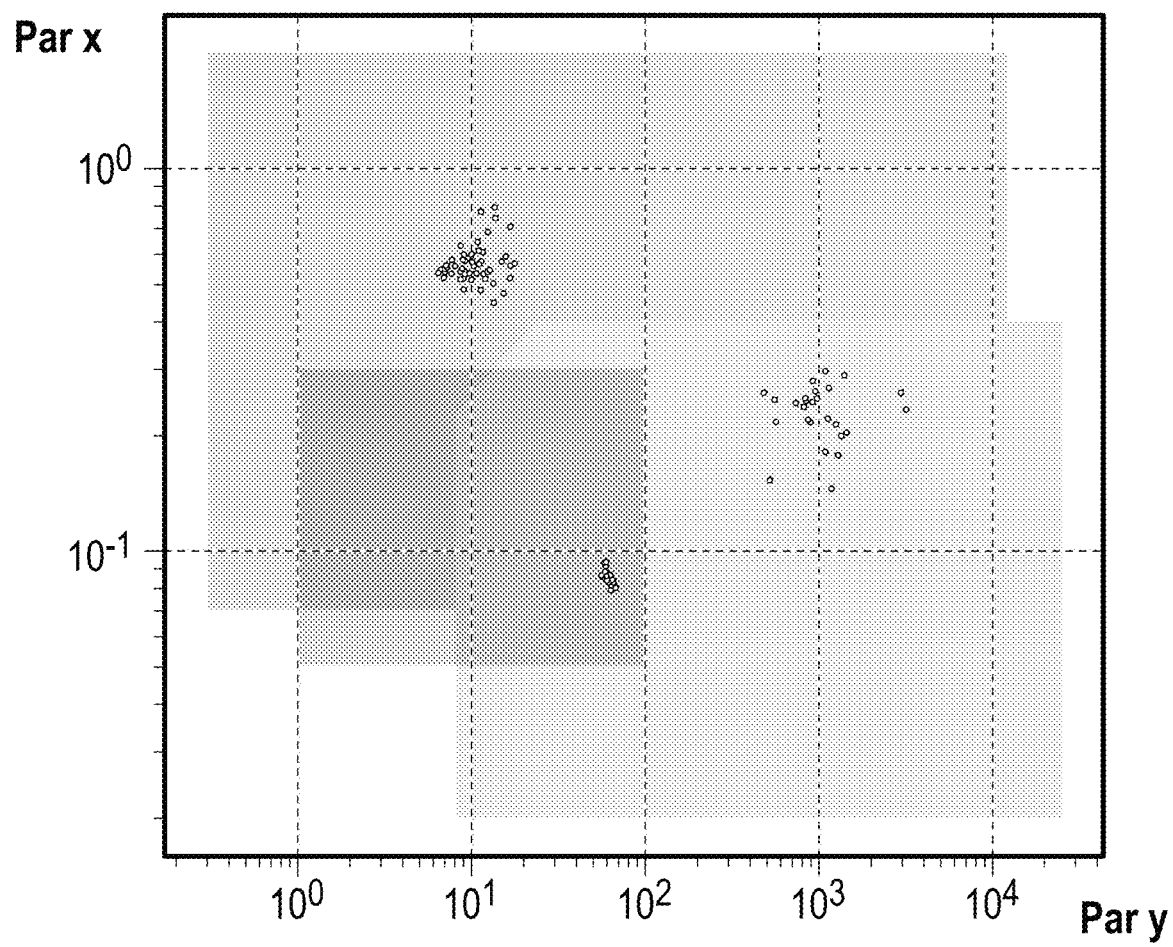
FIG. 15 illustrates a chart of a selection from the chart of FIG. 9 showing identifications with sources shielded by PE.
Figure 16:
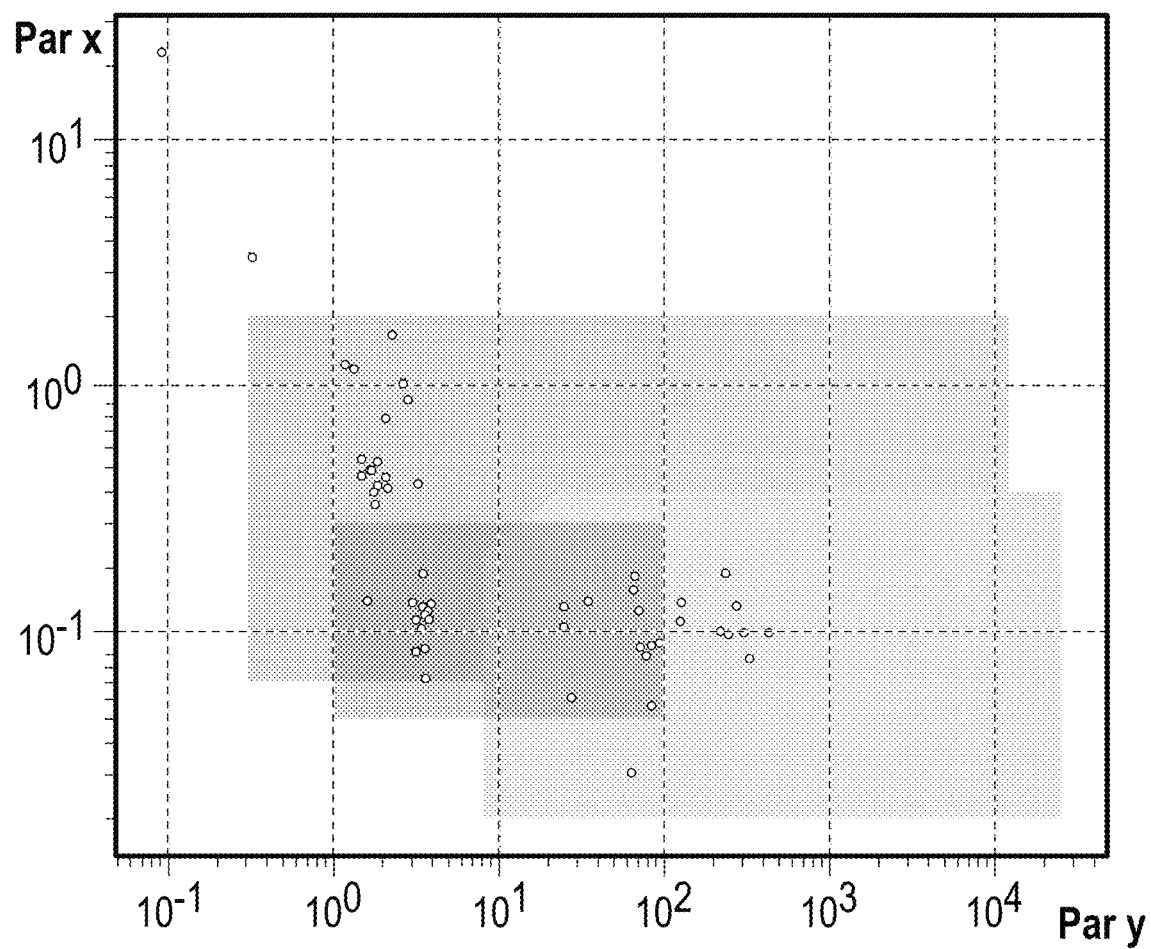
FIG. 16 illustrates a chart of a selection from the chart of FIG. 9 showing identifications with sources shielded by Pb+PE.

FIG. 14, FIG. 15 and FIG. 16 show the various measurements with shielding, respectively only Pb (5 cm), only PE (from 2 cm to 10 cm) and Pb+PE (Pb 5 cm, PE from 2 to 10 cm), always keeping a number of neutrons >8 cpm (0.133 cps).

From these charts the expected behavior is verified: the presence of Pb shifts the measurement towards the regions with less $R_C$, unlike polyethylene.

Figure 17:
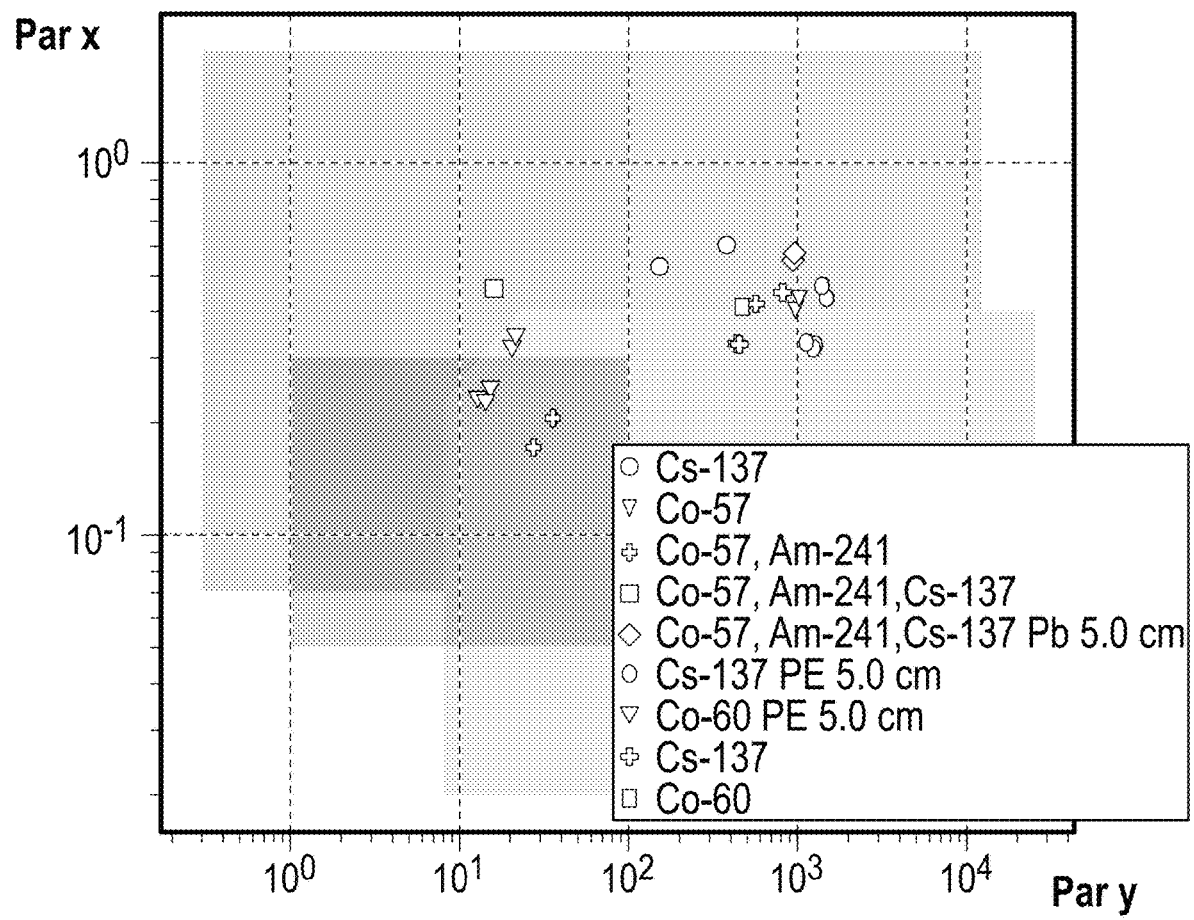
FIG. 17 illustrates a chart of SNM identification in masking condition with gamma sources.

Finally, FIG. 17 shows cases with gamma sources in addition to the neutron source (Cf-252 in blue, Pu in orange). In the case of the Cf-252, it can be seen how the points move in the plane according to the energy of the gamma sources used as masking (in addition to their relative dose). As the dose due to the gamma masking source increases, the points move instead to the regions with greater $R_C$ (increasing range multiplicity). In this way the regions were defined to identify the presence of masking.

Figure 18:
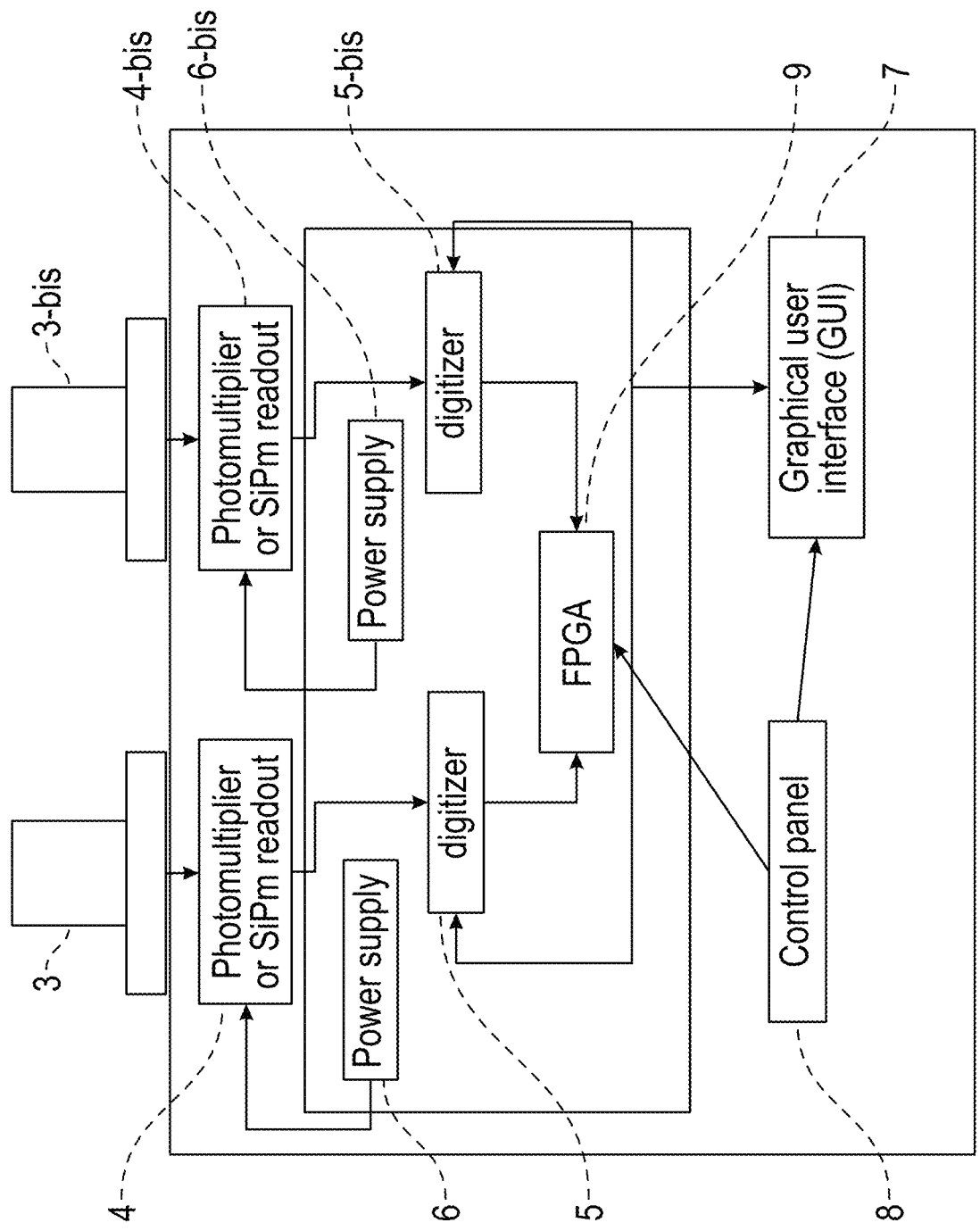
FIG. 18 illustrates a block diagram of the device for gamma and neutron identification according to the invention.

With reference to enclosed FIG. 18 a portable device for the recognition of a radioactive source is generally indicated with 1. A radioactive source Rad, which emits both n neutrons and gamma γ radiation, is schematically indicated.

The portable device 1 is equipped with a type II detector 3 consisting, in a preferred embodiment, of a cylindrical cell of organic liquid scintillator. In another embodiment the detector 3 is of the type that uses xylene as an organic solvent, i.e., the EJ 309 model by Eljen Technology which has innovative characteristics like low flammability and lower toxicity which make it suitable for commercial use on a commercial scale.

The sensor is coupled to a photomultiplier or SiPm readout 4, for example the Hamamatsu model H12700, connected to a miniaturized power supply circuit 6 that provides to the photomultiplier 4 the high voltage necessary for its correct operation. Detector 3 can detect both the light pulses produced by the interaction with neutrons (interaction known as "n-p scattering") and the gamma radiation (interaction known as "Compton scattering").

A digitizer circuit 5 of the fast type is adapted to convert light pulses into digital signals, analyzed and processed in line through a programmable integrated digital processor 9, e.g., a FPGA ("Field Programmable Gate Array").

The portable device 1 is also equipped with a type I detector 3-*bis* consisting of a cylindrical cell of organic crystal scintillator. In a preferred embodiment variant, the sensor 3-*bis* is of the type that uses Cerium-Bromide ($CeBr_3$) crystal lattice, i.e., the $CeBr_3$ model by Scionix-Holland which provides a greater ability to discriminate gamma γ radiation close in energy (this characteristic is called detector resolution: a better resolution provides higher ability to distinguish two gamma γ close in energy).

The sensor 3-*bis* is coupled to a photomultiplier tube or SiPm readout 4-*bis*, connected to a miniaturized power supply circuit 6-*bis* that provides to the photomultiplier 4-*bis* the high voltage necessary for its correct operation.

Sensor 3-*bis* can detect only the light pulses produced by the interaction with gamma radiation γ, while its sensitivity to neutron n radiation is close to zero. The sensor 3-*bis* interacts with gamma not only with an interaction known as "Compton scattering" (like sensor 3) but also with interaction known as "photoelectric effect". This effect releases all the energy of the gamma γ radiation in a single interaction and the detector can record the total energy of the gamma in a single shot. Since each Radioactive source Rad has its own characteristic gamma γ lines (each one with different energies), by collecting all the energy of each gamma is possible to exactly recognize the radioactive source Rad (like with a fingerprint) with a single measurement made with the sensor 3-*bis*.

The light pulses (fingerprint) collected by the sensor 3-*bis* are converted, by means of a digitizer circuit 5-*bis* of the fast type, into digital signals, analyzed and processed in line through a programmable integrated digital circuit 9, e.g., a FPGA ("Field Programmable Gate Array").

The device 1 also embeds a graphic user interface (GUI) 7 and a control panel 8 for the exchange of information and data between the device 1 and its user.

All components of the device 1 have dimensions and weights compatible with a single user transportation and manipulation.

The programmable integrated circuit 9 may work also as an internal memory of the device 1, in which a data processing program comprising a plurality of instructions for the execution of the method according to the present invention is loaded. Said method allowing the recognition of the radioactive source Rad when the program is executed from portable device 1.

What is claimed is:

1. A method for identifying a radioactive source comprising the steps of:
    a) detecting, using a gamma spectroscopic Type I detector, gamma emitting sources of said radioactive source;
    b) detecting, using a gamma/neutron Type II detector, a plurality of impulses of said radioactive source, said plurality of impulses being associated with respective neutron emissions and gamma emissions;
    c) identifying a first portion of said plurality of impulses associated with respective neutron emissions and a second portion of said plurality of impulses associated with respective gamma emissions, said step of identifying said first portion and said second portion of impulses including a calculation for each impulse of a respective total integral Ltot of the impulse, and further comprising the steps of:
    d) determining a first number $n_n$ of impulses belonging to the first portion of said plurality of impulses and a second number $n_\gamma$ of impulses belonging to the second portion of said plurality of impulses;
    e) calculating a first average value $E_n$ and a second average value $E_\gamma$ of the total integral Ltot, wherein $E_n = \Sigma N_n (Ltot/n_n)$, and $E_\gamma = \Sigma n_\gamma (Ltot/n_\gamma)$;
    f) calculating datum $par_x = n_x/n_n$ and datum $par_y = E_\gamma/E_n$;
    g) identifying if the radioactive source belongs to a first group of neutron sources or to a second group of gammas sources by the data $par_x$, $par_y$;
    h) if in step (g), the radioactive source belongs to the first group of neutron sources, identifying gamma sources detected with the first group of neutron sources using the Type I detector, through spectroscopy;
    i) double confirming identification of the radioactive source of step (g) if both gamma and neutron sources are detected;
    j) detecting a masking condition of neutrons in presence of gamma emissions, performed by merging results of the identification from the Type I detector with the results of the identification from the Type II detector; and
    k) detecting and identifying gamma and neutron sources in presence of moderators and/or shielding materials through the Type II detector.

2. The method according to claim 1 wherein detecting, from said radioactive source, of the gamma emitting sources with the gamma spectroscopic Type I detector comprises acquiring:
    a first identification spectrum, Spec1;
    a background as a reference spectrum; and
    a second identification spectrum, wherein Spec2=Spec1−Background.

3. The method according to claim 2 wherein detecting, from said radioactive source, of gamma emitting sources with a gamma spectroscopic Type I detector comprises:
    searching for gamma peaks on the second identification spectrum, spec2;
    validation of spec2 peaks;
    validation of spec1 peaks;
    searching for further peaks;
    computation of integrals within a region of interest;
    searching of multiplets;
    rejection of possible duplicated peaks;
    Compton edge and backscatter peak identification;
    gamma source identification; and
    minor source identification.

4. The method according to claim 1 wherein detecting, from said radioactive source, of the gamma emitting sources with the gamma/neutron Type II detector comprises acquiring:
    a third identification spectrum, Spec3;
    a fourth identification spectrum, Spec4; and
    a background as a reference spectrum.

5. The method according to claim 1, wherein merging the results of the identification of the Type I detector with the results of the identification of the Type II detector comprises:
    validation of AmLi source;
    masking condition determination for neutron sources; and
    estimation of enrichment grade.

6. The method according to claim 1 wherein the Type II detector is replaced by a thermal neutron Type III detector.

7. The method according to claim 6, wherein the Type I detector is replaced by a Type II detector.

8. The method according to claim 1, wherein the Type I detector uses Cerium-Bromide ($CeBr_3$) crystal lattice.

9. The method according to claim 1, wherein the Type II detector uses xylene as an organic solvent.

10. A device for identifying a radioactive source comprising:
- a first photomultiplier or a first SiPm readout associated to said gamma/neutron Type II detector;
- a first digitizer circuit associated to said first photomultiplier or the first SiPM readout and adapted to convert light pulses into digital signals;
- a first power supply circuit associated to said first photomultiplier or the first SiPM readout;
- a second photomultiplier or a second SiPm readout associated to said spectroscopic Type I detector;
- a second digitizer circuit associated to said second photomultiplier or the second SiPM readout and adapted to convert light pulses into digital signals;
- a second power supply circuit associated to said second photomultiplier or the second SiPM readout;
- a programmable digital processor associated to said first and second photomultipliers or the first and second SiPM readouts;
- a user interface, GUI; and
- a control panel for exchange of information and data with a user, wherein the programmable digital processor is programmed with a plurality of instructions for executing the method according to claim 1.

* * * * *